US006202926B1

(12) United States Patent
Ito et al.

(10) Patent No.: US 6,202,926 B1
(45) Date of Patent: Mar. 20, 2001

(54) MAGNETIC RECORDING MEDIUM AND METHOD OF MAKING THE SAME

(75) Inventors: Masahiro Ito; Shohei Mimura, both of Kanagawa; Masao Shigeta; Tsutomu Chou, both of Chiba, all of (JP)

(73) Assignees: Tokyo Magnetic Printing Co., Ltd.; TDK Corporation, both of Tokyo (JP)

( * ) Notice: Subject to any disclaimer, the term of this patent is extended or adjusted under 35 U.S.C. 154(b) by 0 days.

(21) Appl. No.: 09/244,986

(22) Filed: Feb. 4, 1999

Related U.S. Application Data

(63) Continuation of application No. PCT/JP98/02484, filed on Jun. 4, 1998.

(30) Foreign Application Priority Data

Jun. 4, 1997 (JP) .................................................. 9-161978
Jun. 4, 1997 (JP) .................................................. 9-161979
Jun. 4, 1997 (JP) .................................................. 9-161980
Jun. 4, 1997 (JP) .................................................. 9-161981

(51) Int. Cl.$^7$ ............................................... G06K 7/08
(52) U.S. Cl. .................. 235/449; 235/494; 235/380; 235/454; 503/217; 503/216
(58) Field of Search ..................... 235/449, 380, 235/493, 454, 494, 487, 486; 902/16; 503/217, 201, 216; 360/2

(56) References Cited

U.S. PATENT DOCUMENTS

| 4,367,402 | * | 1/1983 | Giraud et al. | 235/385 |
| 5,160,833 | * | 11/1992 | Nakahara | 235/449 |
| 5,471,044 | * | 11/1995 | Hotta et al. | 235/487 |
| 5,691,272 | * | 11/1997 | Matsumoto et al. | 503/217 |
| 5,736,722 | * | 4/1998 | Chamberlain, IV | 235/449 |
| 6,029,895 | * | 2/2000 | Ito et al. | 235/493 |

FOREIGN PATENT DOCUMENTS

| 62-28901 | 2/1987 | (JP) . |
| 6-187636 | 7/1994 | (JP) . |
| 7-314961 | 12/1995 | (JP) . |
| 9-128508 | 5/1997 | (JP) . |

* cited by examiner

Primary Examiner—Thien M. Le
Assistant Examiner—Daniel S. Felten
(74) Attorney, Agent, or Firm—Oblon, Spivak, McClelland, Maier & Neustadt, P.C.

(57) ABSTRACT

A magnetic recording medium, and methods of making and reading the same, including on at least a portion of a substrate an irreversible recording layer which contains an irreversible recording material undergoing an irreversible change of saturation magnetization upon heating. The invention involves the steps of previously heating the irreversible recording layer to form an initial heated region in which a plurality of heated bars whose saturation magnetization has been irreversibly changed are arrayed in a bar code pattern, and converting unheated bars disposed between the heated bars into a heated state for changing the array pattern of heated bars, thereby recording the information.

29 Claims, 15 Drawing Sheets

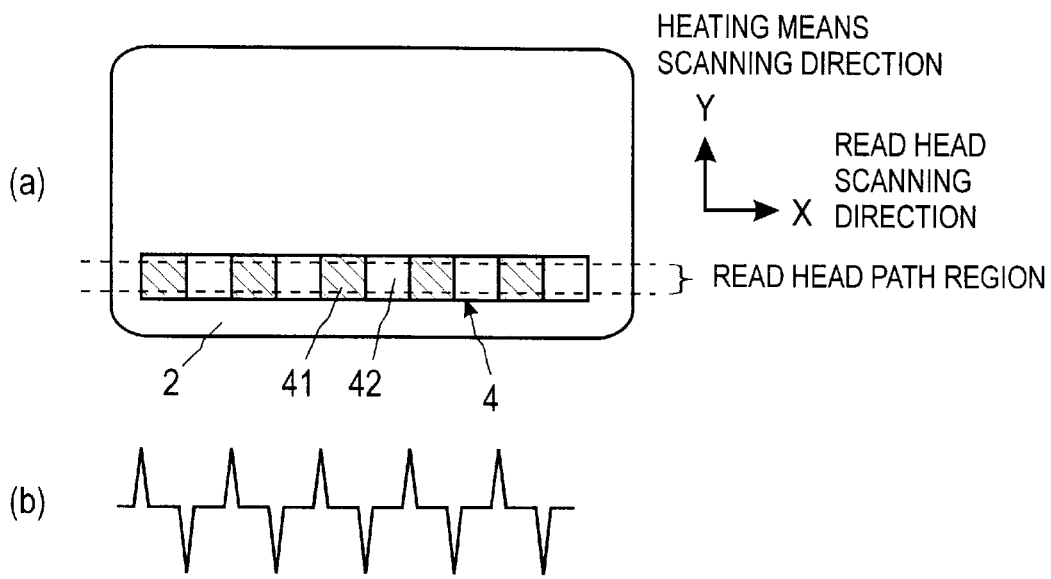
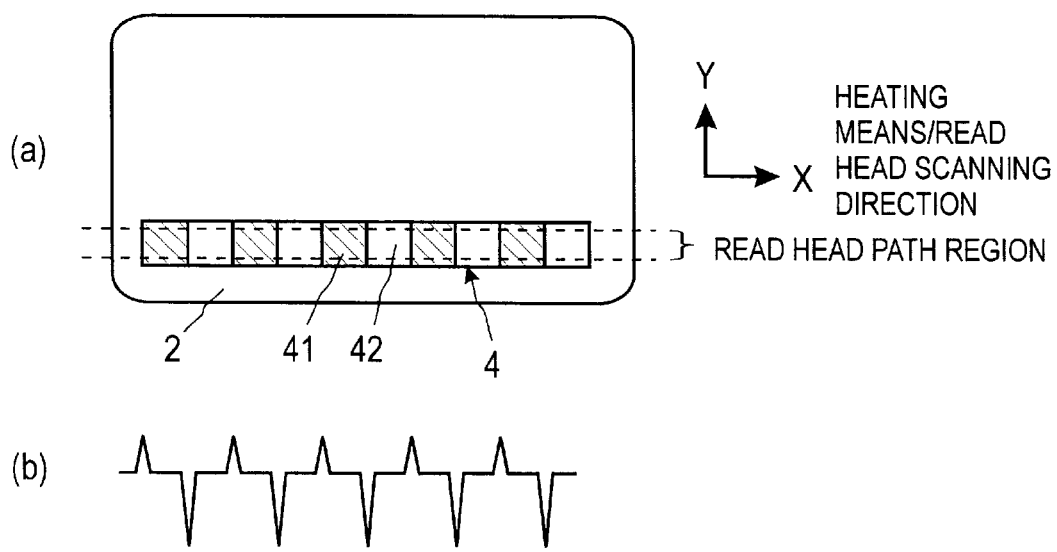

FIG. 7
(a)
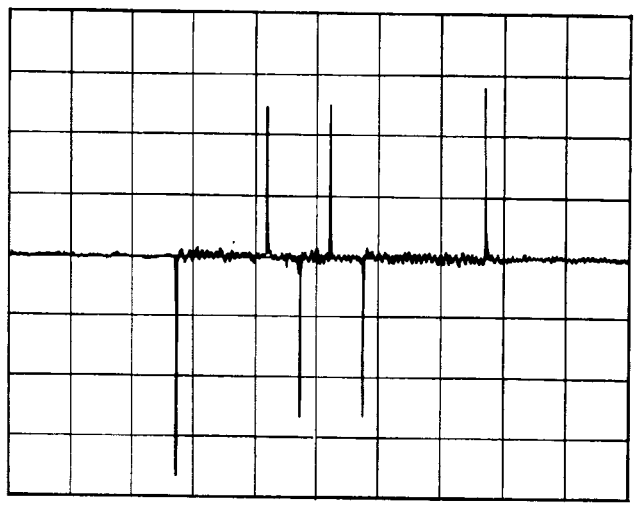
(b)
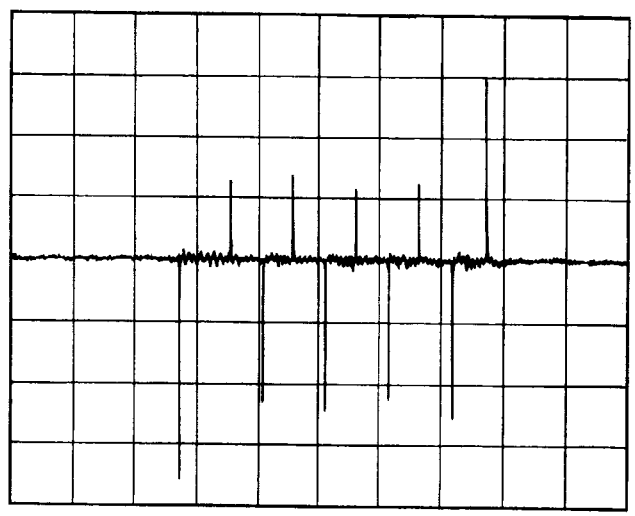

FIG. 8
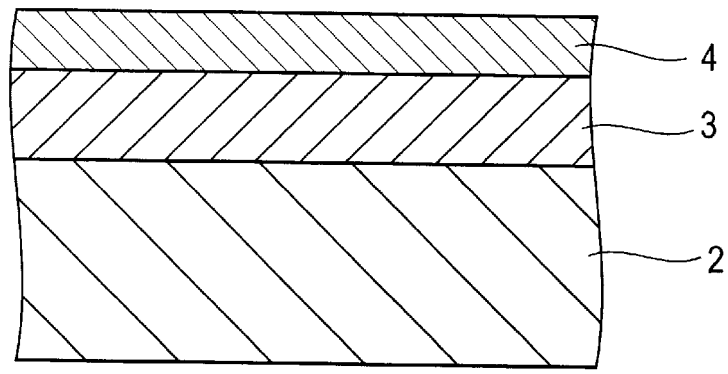
FIG. 9
(a)
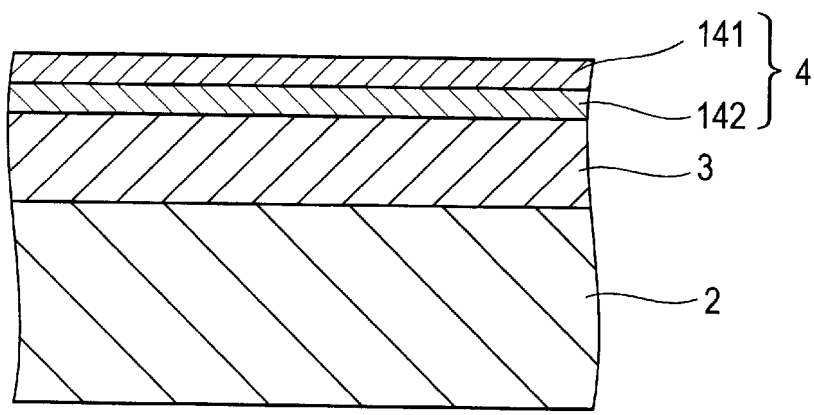
(b)
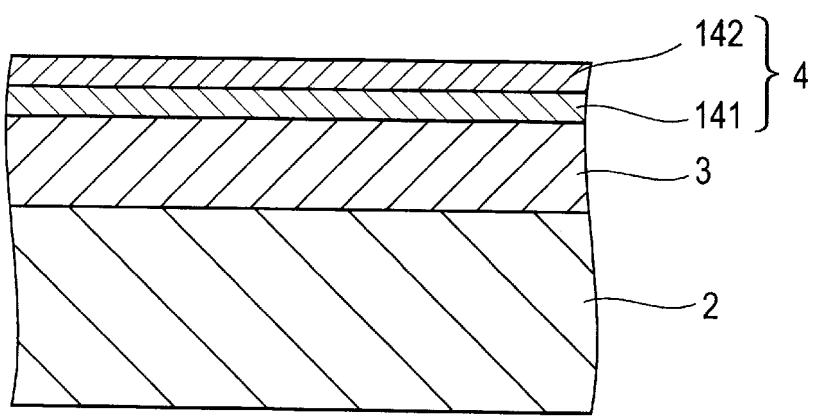

FIG. 13
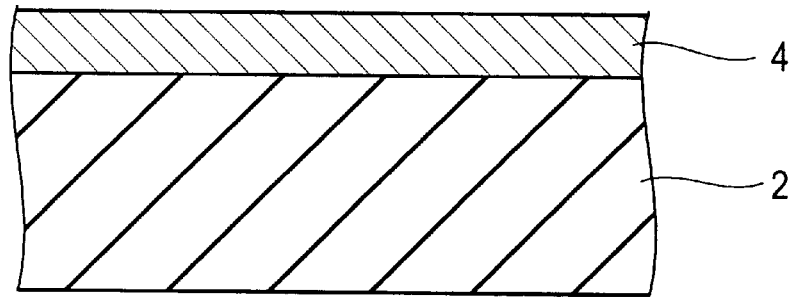
FIG. 14
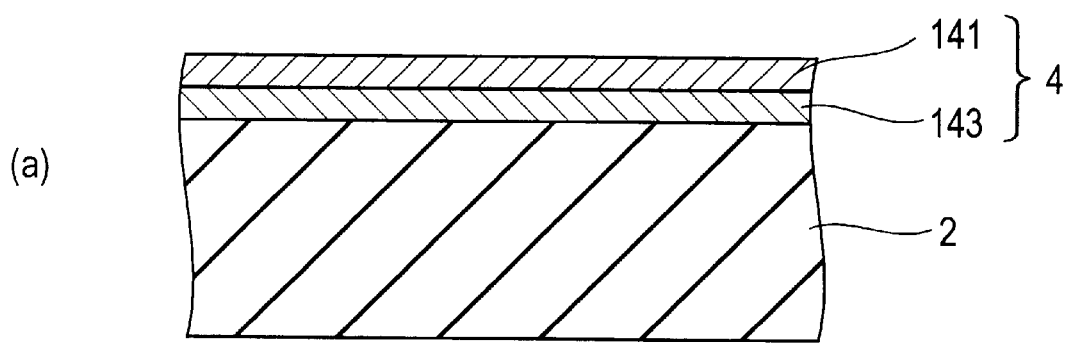
(a)
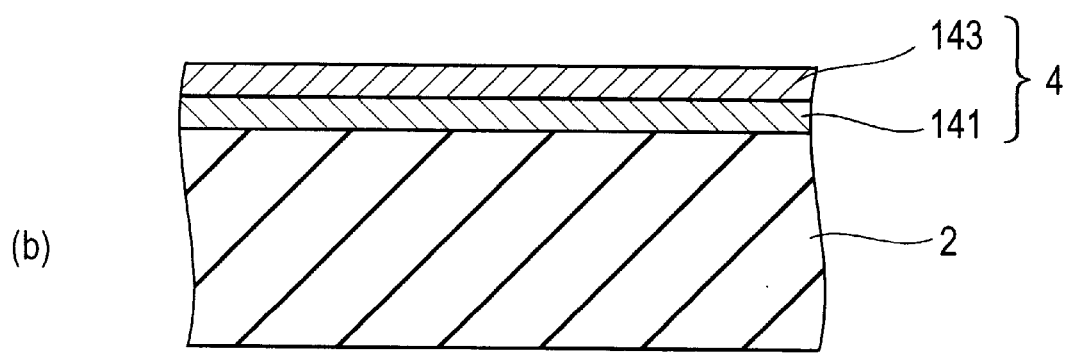
(b)

HEAT WRITING + READING UNDER APPLIED FORWARD BIASING MAGNETIC FIELD

HEAT WRITING + READING UNDER APPLIED REVERSE BIASING MAGNETIC FIELD

PARTIAL REMOVAL + READING UNDER APPLIED FORWARD BIASING MAGNETIC FIELD

PARTIAL REMOVAL + READING UNDER APPLIED REVERSE BIASING MAGNETIC FIELD

FIG. 23
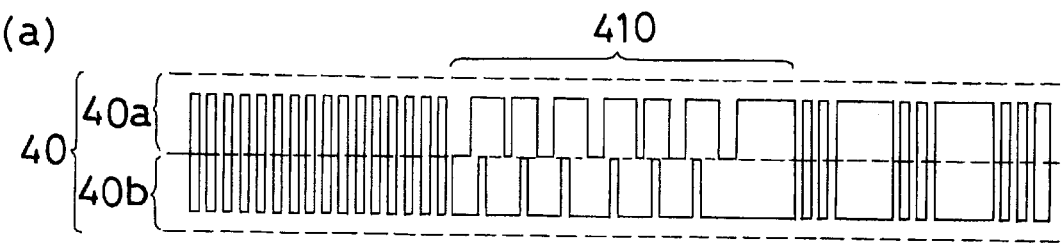
(a)
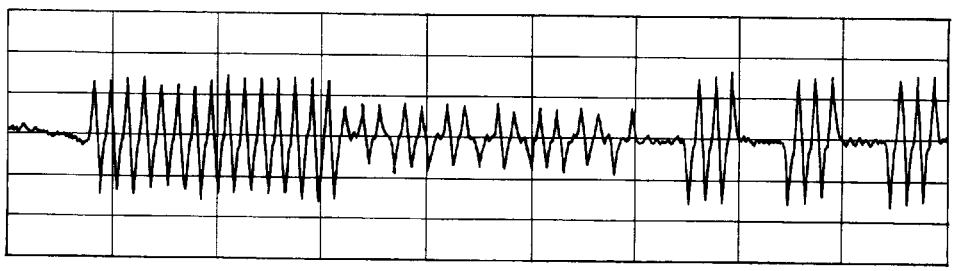
(b) READ WAVEFORM FROM RECORDING TRACK 40
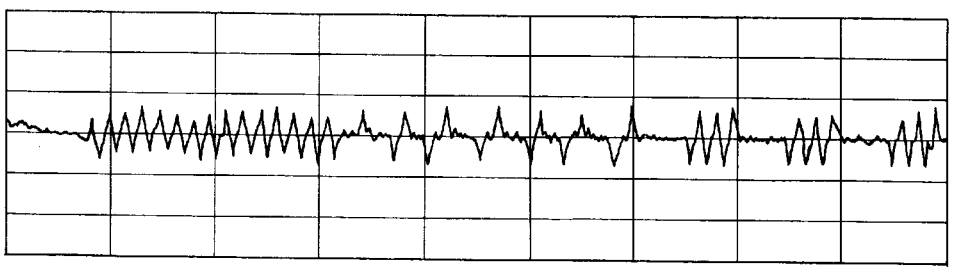
(c) READ WAVEFORM FROM TRACK ELEMENT 40a
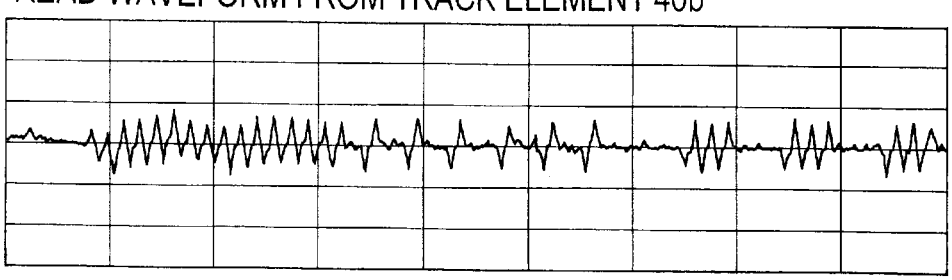
(d) READ WAVEFORM FROM TRACK ELEMENT 40b

MAGNETIC RECORDING MEDIUM AND METHOD OF MAKING THE SAME

This is a continuation of International Application PCT/JP98/02484, with an international filing date of Jun. 4, 1998, claiming priority from Japanese Applications 9-161978, 9-161979, 9-161980, 9-161981, all filed on Jun. 4, 1997.

TECHNICAL FIELD

This invention relates to a method of using magnetic recording media, typically magnetic cards.

BACKGROUND ART

In recent years, magnetic cards have enjoyed widespread use in a variety of fields. In particular, magnetic cards find an expanding application as rewritable or prepaid cards in which monetary information is recorded as magnetic bits of information so that the amount of money may be reduced on every use.

In this application, the safety of the card system is fatally lost if magnetic cards are not fully protected against forgery by the alteration of recorded data or counterfeit cards can be easily produced. There is a strong demand for magnetic cards having a protective function of preventing the alteration of the recorded data. To meet the demand, a variety of magnetic cards have been proposed and used in practice. For example, if magnetic cards are locally provided with a region of a special material, they are difficult to counterfeit and whether they are false or true can be judged by detecting the special region. Magnetic cards with a complex layer arrangement are also known.

These magnetic cards having the protective function incorporated therein are difficult to forge or to duplicate in numbers. However, there is still a possibility that the monetary information in an exhausted card be restored to the initial information by false alteration, for example, by rewriting the monetary information. One countermeasure is to punch holes in the card in accordance with the number of uses although this raises several problems, such as punched chips left behind, and repair by refilling the holes being possible. Another possible countermeasure is to record visible data corresponding to the number of uses by thermographic recording. These cards carrying visible data, however, are weak against staining because the visible data must be optically read. The falsification of the record is easy on account of visible data. Another problem is that optical readers are generally expensive.

In view of the above problems, JP-A 77622/1996 proposes a magnetic recording medium comprising an irreversible recording layer using as a magnetic recording material an alloy whose ratio of the saturation magnetization in a crystalline state to the magnetization in an amorphous state is at least 5. This magnetic recording medium has an irreversible recording layer composed of a recording material which undergoes an irreversible change of saturation magnetization upon heating. Although this recording material changes its saturation magnetization upon heating, rewriting is substantially impossible because in order to restore the saturation magnetization to the value prior to heating, the magnetic recording medium must be heated to such an extent that the medium may be deformed or melted. The medium insures high safety.

However, the only method for effecting information recording in such an irreversible recording layer disclosed therein is a method of heating the layer in a pattern corresponding to the record information using a thermal head. A method taking advantage of an irreversible recording material has not been proposed.

SUMMARY OF THE INVENTION

A first object of the invention is to hinder the false alteration of record information in a magnetic recording medium such as a magnetic card and to facilitate recording of substantially unalterable information.

A second object of the invention is to suppress an output variation of the magnetic recording medium in addition to the attainment of the first object.

A third object of the invention is to improve the secrecy of recorded information in addition to the attainment of the first object.

A fourth object of the invention is to enable to easily detect the false alteration of record information in addition to the attainment of the first object.

A fifth object of the invention is to make it more difficult to forge or counterfeit the medium in addition to the attainment of the first object.

The first to fifth objects are attained by the following first to fifth embodiments, respectively.
First embodiment
　(1) to (5) below
Second embodiment
　(6) below
Third embodiment
　(7) to (9) below
Fourth embodiment
　(10) to (15) below
Fifth embodiment
　(16) below (1) A method of using a magnetic recording medium comprising on at least a portion of a substrate an irreversible recording layer which contains an irreversible recording material undergoing an irreversible change of saturation magnetization upon heating, said method comprising the steps of:
　previously heating said irreversible recording layer to form an initial heated region in which a plurality of heated bars whose saturation magnetization has been irreversibly changed are arrayed in a bar code pattern, and
　converting unheated bars disposed between the heated bars into a heated state for changing the array pattern of heated bars, thereby effecting information recording.

(2) A method of using a magnetic recording medium as set forth in (1) wherein said magnetic recording medium is a magnetic card, said information recording is recording of the fixed information of the magnetic card, and said information recording is effected at the issue of the magnetic card.

(3) A method of using a magnetic recording medium as set forth in (1) or (2) wherein said information recording is recording of the use history of the magnetic recording medium.

(4) A method of using a magnetic recording medium as set forth in any one of (1) to (3) wherein the step of converting unheated bars into a heated state changes the array pattern of heated bars into an encoded array pattern.

(5) A method of using a magnetic recording medium as set forth in any one of (1) to (4) wherein said initial heated region includes a region where the heated bars of equal width are arrayed in an equi-spacing pattern.

(6) A method of using a magnetic recording medium as set forth in any one of (1) to (5) wherein said irreversible recording layer is scanned with a heating means for heating for effecting recording, and the scanning direction of said heating means is substantially perpendicular to the direction in which the layer is scanned with a read head during reading operation.

(7) A method of using a magnetic recording medium as set forth in any one of (1) to (6) wherein said magnetic recording medium has a magnetic recording layer between said irreversible recording layer and said substrate wherein said irreversible recording layer functions as a magnetic shield layer.

(8) A method of using a magnetic recording medium as set forth in (7) wherein said irreversible recording layer contains a soft magnetic material in addition to the irreversible recording material.

(9) A method of using a magnetic recording medium as set forth in (7) wherein said irreversible recording layer is comprised of a soft magnetic material layer containing said soft magnetic material and an irreversible recording material layer containing said irreversible recording material.

(10) A method of using a magnetic recording medium as set forth in any one of (1) to (9) wherein said irreversible recording layer contains a hard magnetic material whose saturation magnetization does not substantially change upon heating and which has a higher coercivity than said irreversible recording material.

(11) A method of using a magnetic recording medium as set forth in (10) wherein said irreversible recording layer is comprised of an irreversible recording material layer containing said irreversible recording material and a hard magnetic material layer containing said hard magnetic material.

(12) A method of using a magnetic recording medium as set forth in (10) or (11) wherein said hard magnetic material has a coercivity of at least 300 Oe.

(13) A method of using a magnetic recording medium as set forth in any one of (10) to (12) wherein
recording is effected by heating said irreversible recording layer for causing said irreversible recording material to undergo a change of saturation magnetization, and
reading is effected by detecting a magnetization change of said irreversible recording layer, with said hard magnetic material having been magnetized in one direction, while applying a biasing magnetic field whose orientation is opposite to said one direction and which does not cause said hard magnetic material to reverse its magnetization.

(14) A method of using a magnetic recording medium as set forth in any one of (10) to (12) wherein
recording is effected by heating said irreversible recording layer for causing said irreversible recording material to undergo a change of saturation magnetization, and
reading is effected by the step of detecting a magnetization change of said irreversible recording layer, with said hard magnetic material having been magnetized in one direction, while applying a biasing magnetic field whose orientation is in said one direction and the step of detecting a magnetization change of said irreversible recording layer, with said hard magnetic material having been magnetized in one direction, while applying a biasing magnetic field whose orientation is opposite to said one direction and which does not cause said hard magnetic material to reverse its magnetization.

(15) A method of using a magnetic recording medium as set forth in (13) or (14) wherein the strength of the biasing magnetic field is lower than the coercivity of said hard magnetic material and higher than the coercivity of said irreversible recording material.

(16) A method of using a magnetic recording medium as set forth in any one of (1) to (15) wherein said magnetic recording medium has at least one recording track in said irreversible recording layer, and
the heating means is controlled during recording such that at least two track elements in which heated bars are arrayed in a bar code pattern are arranged substantially parallel to each other to construct one recording track, and the recording track includes at least in part an asymmetric region in which the array pattern of heated bars differs between at least two track elements.

It is preferred in the above embodiments that said irreversible recording layer have a surface roughness (Ra) of up to 1 μm.

BRIEF DESCRIPTION OF THE DRAWINGS

FIG. 5(a) is a plan view illustrating the scanning direction of heating means during recording (or heating) relative to the scanning direction of a read head during reading in the second embodiment.

FIG. 5(b) is a graph showing read outputs (differential outputs of magnetization) produced therein.

FIG. 6(a) is a plan view illustrating the scanning direction of heating means during conventional recording (or heating) relative to the scanning direction of a read head during reading in the second embodiment.

FIG. 6(b) is a graph showing read outputs (differential outputs of magnetization) produced therein.

FIG. 7(a) is a graph showing read outputs (differential outputs of magnetization) produced in an example of the second embodiment; and FIG. 7(b) is a graph showing read outputs (differential outputs of magnetization) produced in a comparative example.

FIG. 8 is a cross-sectional view showing an exemplary construction of a magnetic recording medium used in the third embodiment.

FIGS. 9(a) and 9(b) are cross-sectional views showing exemplary constructions of magnetic recording media according to the third embodiment.

FIG. 13 is a cross-sectional view showing an exemplary construction of a magnetic recording medium used in the fourth embodiment.

FIGS. 14(a) and 14(b) are cross-sectional views showing exemplary constructions of magnetic recording media according to the fourth embodiment.

FIG. 16(a) showing differential outputs of irreversible recording material layer 141, FIG. 16(b) showing differential outputs of hard magnetic material layer 143, FIG. 16(c) showing differential outputs of the overall irreversible recording layer 4.

FIG. 17(a) showing differential outputs of irreversible recording material layer 141, FIG. 17(b) showing differential outputs of hard magnetic material layer 143, FIG. 17(c) showing differential outputs of the overall irreversible recording layer 4.

FIG. 19(a) showing differential outputs of irreversible recording material layer 141, FIG. 19(b) showing differential outputs of hard magnetic material layer 143, FIG. 19(c) showing differential outputs of the overall irreversible recording layer 4.

FIG. 20(a) showing differential outputs of irreversible recording material layer 141, FIG. 20(b) showing differential outputs of hard magnetic material layer 143, FIG. 20(c) showing differential outputs of the overall irreversible recording layer 4.

FIG. 23(a) is a plan view showing the heated bar array pattern in the recording track of the magnetic recording medium used in the fifth embodiment; FIG. 23(b) is a pattern of differential outputs read from this recording track; FIG. 23(c) is a pattern of differential outputs read from the recording track when the upper one of two track elements divided from the recording track of FIG. 23(a) is considered as an independent recording track; and FIG. 23(d) is a pattern of differential outputs read from the recording track when the lower one of two track elements divided from the recording track of FIG. 23(a) is considered as an independent recording track.

FUNCTION AND RESULTS

First Embodiment

Figure 1:
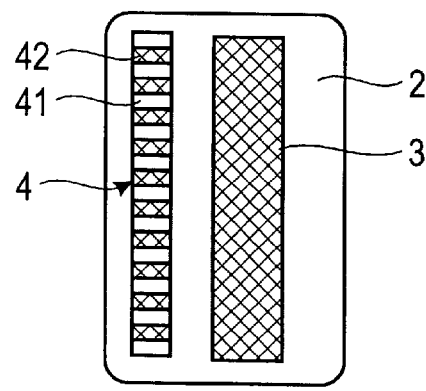
FIG. 1 is a plan view of the exemplary construction of a magnetic recording medium used in the first embodiment.

In a prior art medium having an irreversible recording layer, the information recorded by heating the layer in a bar code pattern is the so-called address information. The information is read out by detecting the width and array pattern of bar-shaped heated portions (to be referred to as heated bars, hereinafter). Therefore, when recording is carried out by the prior art method, that is, by heating an unrecorded irreversible recording layer in a bar code pattern, the start and end ones of heated bars must be relatively strictly controlled. This requires to relatively strictly control the contact area, relative speed, contact time, heat uniformity and other factors between a heating means such as a thermal head and the magnetic recording medium, prohibiting cost reduction of media drives.

In contrast, according to the first embodiment of the invention, a predetermined pattern of heated bars and unheated bars are previously formed in the irreversible recording layer. When a pattern inherent to an individual magnetic recording medium is to be recorded, a specific unheated bar corresponding to the record information is converted to a heated state. In converting the unheated bar to a heated state, it is unnecessary to strictly position the heating means to preferentially heat only the unheated bar. Even when adjacent heated bars are heated again, the same results are obtained as the results from strict positioning. Not only the thermal head, but a thermal stamp or heating bar (resistor) may also be used as the heating means, enabling further cost reduction.

Second Embodiment

FIG. 6(a) is a plan view of a magnetic card having an irreversible recording layer 4 on a substrate 2. In the figure, heated bars 41 are formed in the irreversible recording layer 4 as a pattern of equi-spaced bar codes, regions other than the heated bars 41 being unheated bars 42. The scanning direction of a thermal head upon heating is the X direction in the figure. When this magnetic card is read, it is scanned with a read head for detecting changes of magnetization in the irreversible recording layer. The scanning direction of the read head is the same as the scanning direction of the thermal head, that is X direction in the figure.

Meanwhile, an irreversible recording layer of the coating type containing a resinous binder has a low heat conductivity. Since the thermal head first heats a heat accumulating layer by which the irreversible recording layer is heated, the rise in temperature is slow. This prevents the heated bar 41 from being uniformly heated over its entirety, leading to heating variations. Therefore, where the scanning direction of the thermal head is coincident with the scanning direction of the read head as shown in FIG. 6(a), the differential output upon transition from the unheated bar 42 to the heated bar 41 becomes low as compared with the differential output upon transition from the heated bar 41 to the unheated bar 42, as shown in FIG. 6(b). Since this requires to reduce the threshold value of read output, the read output becomes susceptible to noise, leading to the generation of errors.

To overcome the problem, the second embodiment of the invention is designed to carry out recording by scanning the card with heating means in a direction (Y direction) substantially perpendicular to the reading direction upon reading (X direction) as shown in FIG. 5(a). As a result, heating variations occurring in the scanning direction of the heating means have no influence on read signals, and signals of uniform magnetization changes (differential outputs) as shown in FIG. 5(b) are obtained.

In performing recording and reading in accordance with the second embodiment, it is necessary to use a write/read apparatus in which the scanning direction of the heating means can be made substantially perpendicular to the scanning direction of the read head. It is noted that even with a prior art write/read apparatus in which the scanning direction of the heating means is coincident with the scanning direction of the read head, if the second embodiment is applied to the recording of information (fixed information) to be pre-recorded in a magnetic recording medium before shipment, then reading of the fixed information can be performed without errors on account of the benefits of the second embodiment.

Third Embodiment

In the third embodiment, a conventional magnetic recording layer is provided between the substrate and the irreversible recording layer while the irreversible recording layer also functions as a magnetic shield layer.

In the third embodiment, where an irreversible recording material which reduces its saturation magnetization upon heating is used, the irreversible recording layer generally reduces its magnetic permeability upon heating and hence, generally reduces its magnetic shielding effect. In case an irreversible recording material which increases its saturation magnetization upon heating is used, the magnetic shielding effect generally increases upon heating. By utilizing such a change of the magnetic shielding effect, the third embodiment enables proper treatment of magnetic cards after exhaustion. For example, where an irreversible recording material which reduces its saturation magnetization upon heating is used, the magnetic card which has been exhausted or becomes out of use is treated such that the irreversible recording layer may be heated over its entirety to substantially eliminate its magnetic shielding effect. If a card read-out apparatus is set so as to judge that the magnetic cards which are not magnetically shielded are unusable, exhausted magnetic cards are prohibited from false use. Additionally, prior to the treatment of an exhausted card, the irreversible recording layer exhibits its magnetic shield effect to a full extent so that the information recorded in the magnetic recording layer is kept fully secret. On the other hand, where an irreversible recording material which increases its saturation magnetization upon heating is used, the magnetic card which has been exhausted or becomes out of use is treated such that the irreversible recording layer may be heated over its entirety to develop a magnetic shielding effect. If a card read-out apparatus is set so as to judge that the magnetic cards which are magnetically shielded are unusable, proper treatment of magnetic cards after exhaustion is possible.

If no sufficient magnetic shielding effect is available prior to heating (where saturation magnetization decreases upon heating) or subsequent to heating (where saturation magnetization increases upon heating) when only an irreversible recording material is used as the magnetic shielding material, then a soft magnetic material which is commonly used as a magnetic shielding material may be contained in the irreversible recording layer, or an irreversible recording material layer containing an irreversible recording material and a soft magnetic material layer containing a soft magnetic material may be stacked to construct the irreversible recording layer. However, if a magnetic shielding effect above a certain level is always available due to the addition of the soft magnetic material or the stacking of the soft magnetic material layer, the change of magnetic shielding effect by heating becomes insufficient to enable proper treatment of magnetic cards after exhaustion by the above operation. It is, therefore, necessary to properly set the amount of soft magnetic material added or the thickness of soft magnetic material layer such that heating may produce a sufficient change of magnetic shielding effect.

In this embodiment, the information which has been recorded by heating the irreversible recording material in the irreversible recording layer is read out as follows. First, the magnetic information is read out of the magnetic recording medium without causing the irreversible recording layer to be magnetically saturated. At this point, a magnetic flux leaks from the magnetic recording layer in accordance with the pattern of writing in the irreversible recording layer, and a corresponding read signal is obtained. Next, reading is performed with the irreversible recording layer being magnetically saturated. By determining a difference between the read signal obtained at this point and the read signal obtained with the irreversible recording layer not magnetically saturated, the recorded pattern (heated pattern) of the irreversible recording layer can be read. Since the information recorded in the irreversible recording layer is due to a change of magnetization of the irreversible recording material, false alteration is substantially impossible.

Fourth Embodiment

A false signal can be generated if the irreversible recording layer is mechanically damaged, for example. More illustratively, a non-magnetic region can be formed by partially scraping off the irreversible recording layer. In the case of a magnetic recording medium having an irreversible recording layer which reduces its saturation magnetization upon heating, the scraped-off region can be wrongly recognized to be a written (or heated) region. Accordingly, a magnetic recording medium having such an irreversible recording layer requires a reading method capable of detecting such false alteration.

Then in the fourth embodiment, the irreversible recording layer contains a hard magnetic material as well as the irreversible recording material. The record reading method in this embodiment is described by referring to FIG. 15 which shows as a typical example a magnetic recording medium comprising an irreversible recording layer 4 in the form of a hard magnetic material layer 143 and an irreversible recording material layer 141 stacked thereon. The magnetic information to be read in this embodiment has been recorded by heating the irreversible recording material in accordance with a predetermined pattern.

Upon reading, the hard magnetic material layer 143 must have been magnetized in one direction. A change of magnetization is detected while applying to the irreversible recording layer 4 a biasing magnetic field whose direction is in the one direction (forward biasing magnetic field, hereinafter) or a change of magnetization is detected while applying a biasing magnetic field whose direction is opposite to the forward biasing magnetic field (reverse biasing magnetic field, hereinafter) or both are carried out. With the forward or reverse biasing magnetic field applied, the irreversible recording material layer 141 is magnetized in the direction of the respective biasing magnetic fields. On the other hand, since the strength of the reverse biasing magnetic field is lower than the coercivity of the hard magnetic material layer 143, the hard magnetic material layer 143 does not reverse its magnetization under the reverse biasing magnetic field applied. According to the invention, a change of magnetization of the irreversible recording layer 4 is detected during such reading operation. That is, a differential output is detected.

Figure 15:
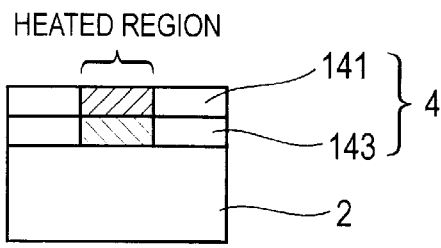
FIG. 15 is a cross-sectional view diagrammatically showing the manner of recording by heating a part of the irreversible recording layer 4 in the fourth embodiment.
Figure 16:
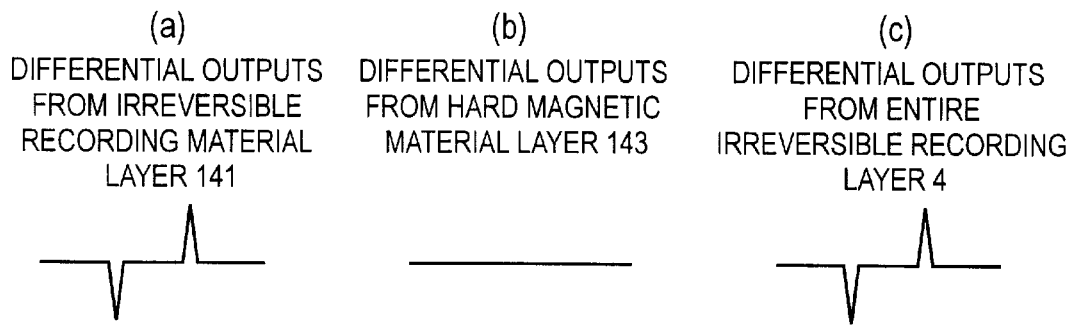
FIG. 16 is a set of graphs diagrammatically showing differential outputs produced when the irreversible recording layer 4 heated as shown in FIG. 15 is read while applying a forward biasing magnetic field.
Figure 17:
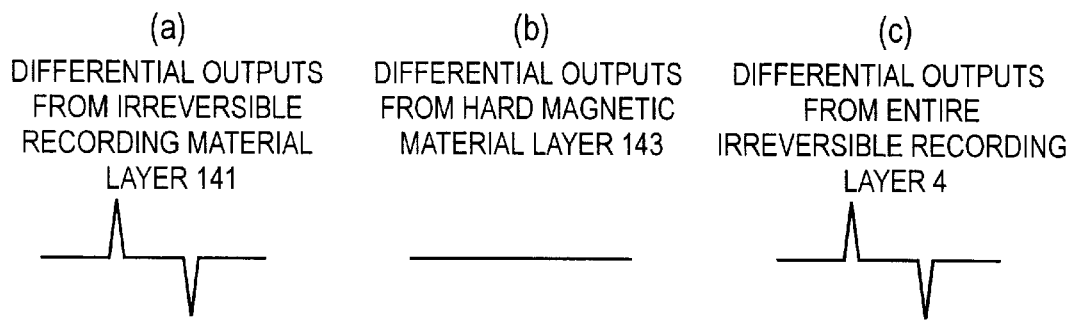
FIG. 17 is a set of graphs diagrammatically showing differential outputs produced when the irreversible recording layer 4 heated as shown in FIG. 15 is read while applying a reverse biasing magnetic field.

FIG. 16 illustrates a situation where reading is performed while applying a forward biasing magnetic field across the medium of FIG. 15, and FIG. 17 illustrates a situation where reading is performed while applying a reverse biasing magnetic field across the medium of FIG. 15. It is noted that the irreversible recording material layer 141 in the illustrated example is to reduce (substantially extinguish) its saturation magnetization upon heating. FIG. 16(a) or 17(a) shows differential outputs produced on the assumption that the irreversible recording material layer 141 is present alone. FIG. 16(b) or 17(b) shows differential outputs produced on the assumption that the hard magnetic material layer 143 is present alone. FIG. 16(c) or 17(c) shows differential outputs of the irreversible recording layer 4 which is a stack of both the layers. Since the hard magnetic material layer 143 has been magnetized in one direction and the hard magnetic material undergoes no change of saturation magnetization by heating, the differential outputs from the hard magnetic material layer 143 are zero as shown in FIGS. 16(b) and 17(b). Accordingly, the differential outputs from the irreversible recording layer 4 reflect the magnetization change pattern of the irreversible recording material layer 141 and the direction of the biasing magnetic field. Understandably, the magnitude (absolute value) of differential outputs of the irreversible recording layer 4 is affected by the magnitude of magnetization of the hard magnetic material layer 143 and the magnitude and direction of the biasing magnetic field.

Figure 18:
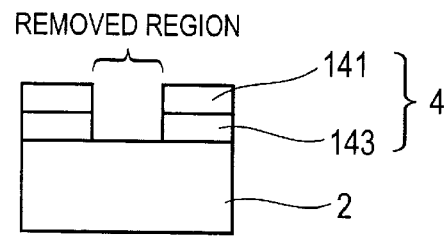
FIG. 18 is a cross-sectional view diagrammatically showing the manner of false alteration of data by removing a part of the irreversible recording layer 4.
Figure 19:
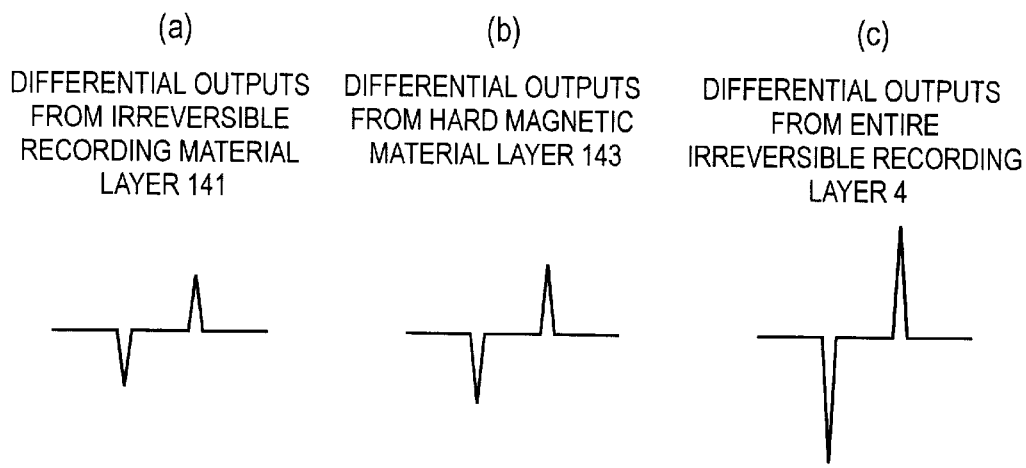
FIG. 19 is a graph diagrammatically showing differential outputs produced when the irreversible recording layer 4 with a part removed as shown in FIG. 18 is read while applying a forward biasing magnetic field.
Figure 20:
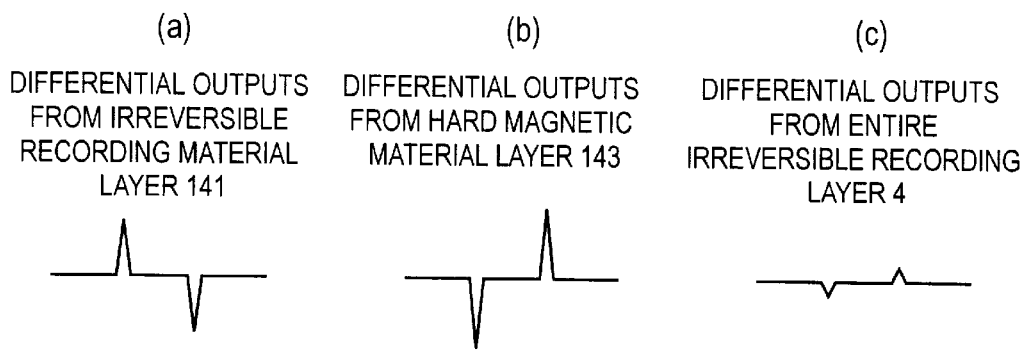
FIG. 20 is a graph diagrammatically showing differential outputs obtained when the irreversible recording layer 4 with a part removed as shown in FIG. 18 is read while applying a reverse biasing magnetic field.

On the other hand, FIG. 18 shows an exemplary falsified medium in which the recorded information is altered by partially removing the irreversible recording layer 4 with a cutter knife or the like. When reading is performed on the falsified medium by applying a forward or reverse biasing magnetic field after the hard magnetic material layer 143 has been magnetized in one direction, differential outputs produced on the assumption that the irreversible recording material layer 141 is present alone are as shown in FIG. 19(a) or 20(a) and thus the same as those in normal heat recording (not false alteration). Therefore, with the irreversible recording material layer 141 alone, the false alteration of data cannot be detected.

However, the differential outputs produced on the assumption that the hard magnetic material layer 143 is present alone are as shown in FIG. 19(b) or 20(b) and thus different from those in normal heat recording. Specifically, since a change of magnetization takes place at the edge of the removed region on account of the partial cut-out of the hard magnetic material layer 143 and the hard magnetic material layer 143 does not reverse its magnetization even when a reverse biasing magnetic field is applied, the differential outputs in both cases have the same polarity change pattern as shown in FIG. 19(b) or 20(b). As a consequence, the differential outputs of the entire irreversible recording layer 4 are as shown in FIG. 19(c) or 20(c). More specifically, since differential outputs (absolute values) largely differ depending on the direction of the biasing magnetic field as shown in FIG. 19(c) or 20(c), false alteration can be readily detected by making a comparison between them.

Understandably, in order to detect the false alteration by removal of the irreversible recording layer, it suffices that discrimination between FIGS. 16(c) and 19(c) or discrimination between FIGS. 17(c) and 20(c) is possible. Specifically, it suffices to perform reading under the forward biasing magnetic field applied or to perform reading under the reverse biasing magnetic field applied and to check any differential output signal different from the reference signal of FIG. 16(c) or 17(c). It is unnecessary to perform reading twice while changing the direction of biasing magnetic field. It is understood, however, that the detection of false alteration of data is ensured by performing reading twice while changing the direction of biasing magnetic field and by comparing the respective reading results.

Where an irreversible recording material which increases its saturation magnetization upon heating is used, the invention is effective in detecting the false alteration by removal of heated regions.

Although the irreversible recording layer 4 is separated into the hard magnetic material layer 143 and the irreversible recording material layer 141 in the illustrated example, the false alteration of data can be detected by the same procedure in the case of the irreversible recording layer 4 of single layer construction which contains both an irreversible recording material and a hard magnetic material as shown in FIG. 13, for example. Additionally, use of the irreversible recording layer 4 of single layer construction containing both an irreversible recording material and a hard magnetic material makes it impossible to remove only the irreversible recording material, ensuring the discrimination of truth from falsehood by the above-mentioned reading procedure.

It is noted that in this embodiment, information may be recorded in the hard magnetic material layer 143 as well. In this case, the information recorded in the hard magnetic material layer 143 is once held in a semiconductor memory or other forms of storage, then the hard magnetic material layer 143 is magnetized in one direction as described above, reading is performed, and after reading, the held information is written back to the hard magnetic material layer 143.

Fifth Embodiment

One exemplary technique of falsifying a magnetic card is to divide magnetic stripes having data recorded in a bar code pattern into two sections in a longitudinal direction and to attach each of the sections to the read-out region of another card or a card form substrate. This falsifying technique inflicts a heavy loss to the card issuer because the value information and marker information including the monetary information at the time of card issue, issue number, branch number, and valid period are duplicated as original.

However, the false alteration or forging of a magnetic recording medium by division of the record track is inhibited by applying the fifth embodiment.

DESCRIPTION OF THE PREFERRED EMBODIMENTS

The present invention has a basis on the first embodiment. At least one of the second to fifth embodiments is combined therewith if desired. Each of these embodiments is described below in detail.

First Embodiment

Use method

FIG. 1 shows one exemplary construction of a magnetic recording medium according to this embodiment. This magnetic recording medium has an irreversible recording layer 4 and a magnetic recording layer 3 on the surface of a substrate 2.

The irreversible recording layer 4 is a layer which contains an irreversible recording material to be described later and undergoes an irreversible change of saturation magnetization upon heating.

According to the invention, the irreversible recording layer is preheated to form an initial heated region in which a plurality of heated bars 41 whose saturation magnetization has been irreversibly changed are arrayed in a bar code pattern. Unheated bars 42 are situated between adjacent ones of the heated bars. The irreversible recording layer 4 in the illustrated embodiment is the one which reduces its saturation magnetization upon heating. In the illustrated embodiment, the initial heated region extends over the entire surface of the irreversible recording layer 4 so that they are coextensive with each other, although the initially heated region may be formed only in a portion of the irreversible recording layer 4.

After the initial heated region is formed in the irreversible recording layer 4, the unheated bars 42 are converted into a heated state for having the irreversible recording layer carry the information. When the unheated bars 42 are heated, accurate positioning between the heating means and the medium is not necessary as previously mentioned.

The type of information to be recorded in the initial heated region is not critical. When the invention is applied to magnetic cards, for example, the information inherently attributed to individual cards and to be carried on the individual cards upon issue thereof, which is referred to as fixed information in this disclosure, can be recorded.

Also the use history of the magnetic recording medium, for example, the number of uses of a magnetic card can be recorded. As shown in FIG. 2(a), for example, a plurality of heated bars 41 are formed to an equal width and equal spacing. As a consequence, unheated bars 42 of an equal width and equal spacing are defined. In this state, by heating from one end side of the initial heated region a number of unheated bars 42 corresponding to the number of uses, the number of uses can be recorded.

In the initial heated region, the heated bars may be arrayed at an equal width and equal spacing as described above, although the width or spacing of the heated bars may be unequal as shown, for example, in FIG. 3(a). In the array pattern of FIG. 3(a), the heated bars 41 are unequal in width and spacing and have not the significance of encoded specific information. However, if the array pattern of heated bars is changed to the pattern shown in FIG. 3(b) by heating and erasing selected unheated bars 42, then the array pattern of encoded specific information appears, eventually accomplishing information recording.

Figure 2:
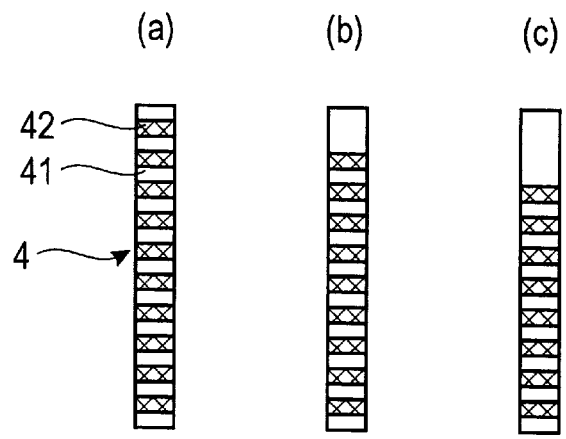
FIGS. 2 (a), 2(b) and 2(c) are plan views showing changes of the heated pattern of the irreversible recording layer in the first embodiment.
Figure 3:
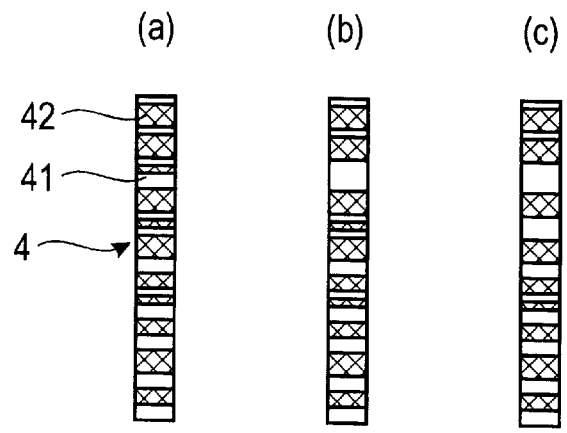
FIGS. 3(a), 3(b) and 3(c) are plan views showing changes of the heated pattern of the irreversible recording layer in the first embodiment.

Although the example illustrated in FIGS. 1 to 3 relates to the medium having an irreversible recording layer which decreases its saturation magnetization upon heating, the benefits of the invention are similarly achieved with a medium having an irreversible recording layer which increases its saturation magnetization upon heating because the same as in the above example applies for the detection of magnetization changes.

In reading the information recorded in the irreversible recording layer 4, the magnetization change pattern in the irreversible recording layer 4 is detected after a dc magnetic field is applied thereacross, or the magnetization change pattern is detected while a dc magnetic field is being applied. In the case of an irreversible recording material which reduces its saturation magnetization upon heating, since those regions of the recording layer which have been heated during recording are not or little magnetized, the magnetization pattern corresponding to the heating pattern during recording can be detected at the time of reading. Also in the case of an irreversible recording material which increases its saturation magnetization upon heating, the magnetization pattern corresponding to the heating pattern during recording can be detected at the time of reading. The means for detecting magnetization is not particularly limited and, for example, a conventional ring type magnetic head or a magnetoresistance (MR) type magnetic head may be used.

It is noted that some of the recording materials which increase their saturation magnetization upon heating already have magnetization at the end of recording without applying a dc magnetic field. Such recording materials permit reading without a need for application of a dc magnetic field. Also for the recording materials which reduce their saturation magnetization upon heating, reading is similarly possible without applying a dc magnetic field if the unheated regions are left magnetized after recording.

Irreversible recording layer

The preferred construction of the irreversible recording layer is described.

The irreversible recording layer is heated from its surface side by a heat source such as a thermal head. In the case of a recording method wherein heating is intermittently carried out to form a matrix of heated dots, a heated region (or equi-temperature region) extends from each heated dot in a substantially hemi-spherical fashion below the layer surface. At this point, if the layer is too thick, insufficiently heated zones are left between adjacent heated dots and in regions remote from the heating source (or deep regions). At the time of reading, the magnetization changes occurring as a result of the insufficiently heated zones are detected as noises. Although read-out outputs themselves are not substantially changed, read-out signals may have a low SN ratio. To prevent such a decline of the SN ratio, the irreversible recording layer should preferably have a thickness of up to 10 $\mu$m. The lower limit of the thickness of the irreversible recording layer, which largely varies with its forming method, is not specifically determined although the lower limit is usually about 1 $\mu$m in the case of a coating method and about 0.01 $\mu$m, preferably about 0.1 $\mu$m in the case of a vacuum deposition method such as sputtering. If the irreversible recording layer is too thin, the output would become insufficient or formation of a uniform layer would become difficult.

The irreversible recording layer at its surface. preferably has a surface roughness (Ra) of up to 1 μm. A greater surface roughness would lead to an extremely low SN ratio. The surface roughness (Ra) is prescribed in JIS B 0601.

It is noted that recording in the irreversible recording layer may be either in-plane magnetic recording utilizing the magnetization in the in-plane direction of the layer or perpendicular magnetic recording utilizing the magnetization in a direction perpendicular to the layer.

Irreversible recording material

The irreversible recording material undergoes an irreversible change of saturation magnetization upon heating. The irreversible recording material has a change ratio of saturation magnetization $4\pi EMs$, that is, ($4\pi Ms$ after heating)/($4\pi Ms$ before heating) or ($4\pi Ms$ before heating)/($4\pi Ms$ after heating), which is preferably at least 2 or up to ½, more preferably at least 3 or up to ⅓. If the change of saturation magnetization is insufficient, it becomes difficult to read out the record information.

It is noted that the saturation magnetization is as measured in the normal environmental temperature range (for example, −10° C. to 40° C.). By the "irreversible change of saturation magnetization" used in this disclosure it is meant that provided that the invention is applied to a magnetic card, the saturation magnetization changes in an irreversible manner when the magnetic card is heated to such a temperature that the card is reusable after heating (for example, about 500° C., preferably about 400° C.).

The temperature at which the irreversible recording material starts to change its saturation magnetization upon heating desirably falls in the range of 50 to 500° C., more desirably 100 to 500° C., and further desirably 150 to 400° C. It is also preferable that a change ratio of saturation magnetization within the above-defined range be obtained in this temperature range. If the temperature at which a change of saturation magnetization starts is too low, the card would become thermally unstable and hence, lose reliability. Additionally, areas near the heated regions become sensitive so that accurate recording becomes difficult. If the temperature at which a change of saturation magnetization starts is too high, the heating temperature required for recording would become high, making it difficult to use less heat resistant resins as the substrate and requiring an expensive recording equipment. For the heating of the irreversible recording layer, a thermal head or other heating means is used. Since the thermal head has a surface temperature of about 400° C., the irreversible recording layer can be heated to about 300° C. by contacting the magnetic recording medium with the thermal head. Upon heating by the thermal head, the temperature in the irreversible recording layer at a position of about 10 μm deep from the surface thereof is raised to about 100 to 140° C. The heating time for recording is not particularly limited although a sufficient change of saturation magnetization is induced by heating for 3 ms or less, and even by heating for 2 ms or less. The lower limit of the heating time is usually about 0.5 ms though it varies with the ultimate temperature.

The Curie temperature of the irreversible recording material is not particularly limited insofar as the Curie temperature permits irreversible recording of signals and reading of the same.

The shape of the irreversible recording material is not particularly limited, and any of thin ribbon, thin film, powder and other forms may be used. In an exemplary application to magnetic cards, thin ribbons of the recording material are prepared by a melt quenching method such as a single chill roll method and attached to the surface of substrates; thin films of the recording material are formed on the surface of substrates by a thin film forming method such as sputtering or evaporation; a powder obtained by comminuting thin ribbons of the recording material or a powder of the recording material prepared by a water atomizing or gas atomizing method is flattened or finely divided by milling means such as a media agitating mill (e.g., attritor), blended with a binder, and coated. Of these, powders obtained by flattening thin ribbons or powders are most preferable. The media agitating mill includes a stationary milling vessel and an agitating shaft or agitator inserted into the vessel wherein the milling vessel is charged with a material to be milled and milling media (such as balls or beads), and the agitating shaft is rotated at a high speed to induce frictional shear forces between the milling media for milling the material. When particles are flattened by the media agitating mill, shear forces are applied to the particles so that in the case of an Fe—Al base alloy to be described later, for example, transformation to a disordered phase may be promoted and higher saturation magnetization be obtained. The use of flattened particles is also effective for improving the surface properties of a coating and hence, magnetic write/read characteristics and the heat transfer upon heating.

Illustrative compositions of the irreversible recording material are not particularly limited although the following compositions are preferably used.

Ni base alloys

For nickel base alloys, a choice is made of the composition that undergoes an increase of saturation magnetization when an alloy in amorphous state is crystallized by heating.

In addition to nickel, preferred nickel base alloys contain at least one element M selected from the group consisting of boron (B), carbon (C), silicon (Si), phosphorus (P), and germanium (Ge) as a metalloid element. The inclusion of such metalloid elements facilitates conversion from an amorphous to a crystalline state and permits a crystallization temperature to be readily set within the preferred range. Element M is preferably at least one of boron, carbon, and phosphorus, with boron and/or carbon being more preferred. Alloys containing boron and carbon are especially preferred because of high saturation magnetization and a low temperature required for crystallization.

Elements other than the above-mentioned may be contained for controlling the crystallization temperature and Curie temperature, and still further elements may be contained insofar as the function and benefits of the invention are not substantially impaired. The elements other than the above-mentioned include Fe, Co, Y, Zr, Gd, Cu, Sn, Al, and Cr, for example. Fe and Co are contained as substituting for part of nickel and by such substitution, the saturation magnetization is increased despite a slight increase of the crystallization temperature.

The nickel content of the nickel base alloy is preferably 65 to 90 at %, more preferably 73 to 83 at %. Too little nickel contents lead to higher crystallization temperatures and lower $4\pi Ms$ in a crystallized state by heating. On the other hand, too high nickel contents make it difficult to prepare an irreversible recording material in an amorphous state. Where nickel base alloys contain boron and carbon, the saturation magnetization in a crystalline state generally increases with an increase of carbon content. However, C/(B+C) is preferably up to 0.45 because too high carbon contents lead to higher crystallization temperatures. Where Fe and/or Co substitutes for part of nickel, the content of Fe+Co in the alloy is preferably 10 at % or less. With too high contents of Fe+Co, amorphous alloys show higher saturation magnetization.

Mn—M (metalloid) base alloys

For Mn—M base alloys, a choice is made of the composition that increases the saturation magnetization when an alloy in amorphous state is crystallized by heating.

In addition to manganese, the alloys contain at least one of metalloid elements M. The preferred metalloid element M is at least one element selected from the group consisting of germanium (Ge), aluminum (Al), boron (B), carbon (C), gallium (Ga), silicon (Si), and chromium (Cr). The inclusion of elements M facilitates conversion from an amorphous to a crystalline state and permits a crystallization temperature to be readily set within the preferred range. Of the elements M, germanium or aluminum is preferred because saturation magnetization increases. Use of germanium is especially preferred because the crystallization temperature becomes lower. When aluminum and/or silicon is added together with germanium, very high saturation magnetization is obtained. Since the addition of aluminum and/or silicon remarkably reduces the saturation magnetization prior to heating, they contribute to increasing the ratio of saturation magnetization before and after heating. The lower limit of the content of Al+Si added is not critical although 0.1 at % or higher is usually preferable. It is preferred that the content of aluminum added be up to 6 at %, the content of silicon added be up to 10 at %, and the content of Al+Si do not exceed 12 at %. Too high contents of aluminum and silicon would reduce the saturation magnetization after heating.

The crystallization mechanism of Mn—M base alloys is not particularly limited although it is generally believed that compounds of manganese with other elements precipitate to induce crystallization and to thereby increase saturation magnetization. It is believed that when germanium is contained, for example, at least a ferromagnetic $Mn_5Ge_3$ phase precipitates, and when alloys contain manganese and aluminum as main components, at least a ferromagnetic $Mn_{55}Al_{45}$ phase precipitates.

The preferred range of the manganese content in alloys, which varies with the type of M contained therein, may be determined as appropriate so as to develop the function and benefits as the irreversible recording material. Usually, the manganese content may be 40 to 80 at %. In the case of Mn-Ge base alloys containing manganese and germanium as main components such as Mn—Ge alloys, Mn—Ge—Al alloys and Mn—Ge—Si alloys, for example, the manganese content is preferably 40 to 80 at %, more preferably 45 to 75 at %. In the case of Mn—Al alloys, the manganese content is preferably 45 to 60 at %, more preferably 50 to 55 at %.

Mn—Sb base alloys

They are alloys containing manganese and antimony. The manganese content in alloys may be determined as appropriate so as to develop the function and benefits as the irreversible recording material. Preferably, the manganese content is 40 to 75 at %, more preferably 44 to 66 at %, further preferably 58 to 66 at %, and most preferably 60 to 66 at %. With too low manganese contents, alloys show low saturation magnetization both before and after heating and hence, a low change ratio of saturation magnetization. With high manganese contents, on the other hand, alloys usually increase their saturation magnetization upon heating. However, if the manganese content is too high, the saturation magnetization after heating is not high enough for easy reading of the recorded information.

In addition to manganese and antimony, the alloys may contain metalloid elements M as mentioned above. The addition of element M generally lowers the crystallization temperature, facilitating recording. Also, when an antiferromagnetic element such as chromium is added in a minor amount, the magnetization prior to heating decreases and as a consequence, the change ratio of saturation magnetization increases. It is noted that the M content should preferably be 15 at % or less because the addition of M reduces saturation magnetization.

When the manganese content falls within the above-defined range, alloys generally increase their saturation magnetization and coercivity upon heating, but some alloys with relatively low manganese contents reduce their saturation magnetization upon heating. Also some alloys reduce their saturation magnetization upon heating, depending on the type of element added other than antimony and the heating temperature. Understandably, since an increased change ratio of saturation magnetization is available from these alloys when they increase their saturation magnetization upon heating, a favorable choice is made of the composition that exhibits such a change of saturation magnetization.

It is noted that since alloys with relatively low manganese contents are likely to crystallize, irreversible recording materials often become crystalline when they are prepared by a quenching method or thin film forming method to be described later. It is believed in this case that a change of magnetic properties by heating results from at least a change from a crystalline phase to another crystalline phase.

Fe—Mn(—C) base alloys

They are alloys containing iron and manganese as main components or iron, manganese and carbon as main components.

In the alloys containing iron and manganese as main components, the preferred contents of the respective elements are:
  Fe: 50 to 75 at %, and
  Mn: 25 to 50 at %,
more preferably
  Fe: 60 to 70 at %, and
  Mn: 30 to 40 at %.
With too low or too high contents of iron and with too low or too high contents of manganese, the change ratio of saturation magnetization before and after heating is low.

In the alloys containing iron, manganese, and carbon as main components, the preferred contents of the respective elements are:
  Fe: 35 to 75 at %,
  Mn: 20 to 50 at, and
  C: 0 to 30 at % (exclusive of 0 at %),
more preferably
  Fe: 35 to 70 at %,
  Mn: 20 to 40 at %, and
  C: 5 to 25 at % (exclusive of 0 at %).
With too low or too high contents of iron and with too low or too high contents of manganese, the change ratio of saturation magnetization before and after heating is low. Carbon is added in order to improve the change ratio of saturation magnetization before and after heating. In order to fully exert such an effect, the content of carbon added is preferably at least 5 at %, more preferably at least 10 at %. Note that too high carbon contents would rather reduce the change ratio of saturation magnetization before and after heating.

The alloys may contain elements other than the above-mentioned, for example, at least one element of B, Si, Al, and Cr. Note that since too high contents of these other elements would sometimes reduce the change ratio of saturation magnetization before and after heating, the total contents of other elements is preferably up to 30 at %.

It is noted that these alloys generally increase their saturation magnetization upon heating, but some alloys with relatively high carbon contents reduce their saturation magnetization upon heating.

Fe—Al base alloys

They are crystalline alloys which undergo an irreversible change of saturation magnetization as a result of an irreversible transformation from a disordered phase to an ordered phase. More specifically, they reduce their saturation magnetization upon heating.

These alloys contain iron and aluminum in a total amount of at least 90 at % while the atomic ratio Al/(Fe+Al), representative of the proportion of aluminum, preferably ranges from 0.30 to 0.45, more preferably from 0.35 to 0.42.

In equilibrium conditions, this alloy exhibits little magnetization on account of an ordered phase and paramagnetism. However, when the alloy is worked, for example, quenched by a melt quenching method or a sputtering or evaporating method, and preferably further milled, it assumes a disordered structure with lattice distortion and exhibits ferromagnetism on account of a change of the magnetism-governing environment around an Fe atom. Once the alloy takes the disordered structure, heating relaxes the structure to reduce the saturation magnetization so that recording utilizing a magnetization change by heating becomes possible. In order that the alloy having reduced its saturation magnetization upon heating be restored to the disordered structure prior to heating, the recording material must be heated to approximately its melting point and then worked again. When the invention is applied to a magnetic card, for example, the magnetic card must be subject to at least the step of heating to a high temperature at which the substrate of the card can be combusted. For this reason, it is substantially impossible to rewrite the information once recorded in the recording material, prohibiting false alteration of information.

More particularly, the equilibrium phase at room temperature of an Fe—Al alloy having an Al/(Fe+Al) within the above preferred range is a paramagnetic B2 phase. The B2 phase is composed of BCC-Fe lattices combined with FeAl lattices of CsCl structure, wherein the fundamental lattices are highly symmetric. When such an alloy is worked, Fe and Al are randomly replaced with each other in atom unit and vacancy and dislocation are introduced in accordance with a degree of working whereby the regularity of the fundamental lattices is lost, the symmetry is significantly reduced, and magnetism develops simultaneously. And, when the worked alloy is heated to a temperature below the melting point, the regularity of the fundamental lattices is at least partially recovered and the saturation magnetization is reduced. Normally the alloy does not resume the state prior to working.

By the change from a disordered phase to an ordered phase by heating, it is meant in this disclosure that the regularity of the fundamental lattices is at least partially recovered by heating. That is, the ordered phase is used in this disclosure in the concept that includes not only the B2 phase having no distortion introduced, but also a phase in which the asymmetry of lattices is partially left. It is noted that the recovery of the symmetry of the fundamental lattices by heating can be ascertained by x-ray diffractometry or electron beam diffractometry.

In these alloys, if the content of aluminum is too low, the change ratio of saturation magnetization upon heating becomes low. On the other hand, with too high contents of aluminum, the environmental resistance of the alloy becomes poor. By the poor environmental resistance used herein, it is meant in this disclosure that thermal stability is low, and more specifically, the alloy reduces its saturation magnetization when stored in an environment at a temperature of about 100° C. With too high contents of aluminum, the alloy undergoes a substantial decline of saturation magnetization during storage in a hot environment, resulting in the change ratio of saturation magnetization becoming extremely low because the saturation magnetization after heating remains unchanged. Further with too high contents of aluminum, the saturation magnetization prior to heating itself becomes low, resulting in read-out signals with a lower SN ratio.

Aluminum in this alloy may be replaced by $M^I$ wherein $M^I$ is at least one element selected from among Si, Ge, Sn, Sb, Bi, Mo, W, Nb, Ta, Ti, Zr, and Hf. The replacement of Al by $M^I$ improves the environmental resistance. However, the content of $M^I$ in the alloy should preferably be up to 10 at % because too high $M^I$ contents reduce the initial saturation magnetization (that is, saturation magnetization inherent to the disordered phase).

Iron in this alloy may be replaced by $M^{II}$ wherein $M^{II}$ is at least one element selected from among Co, Ni, Mn, Cr, V, and Cu. The replacement of Fe by $M^{II}$ improves the change ratio of saturation magnetization. Among elements $M^{II}$, chromium is quite effective for improving corrosion resistance. However, the content of $M^{11}$ in the alloy should preferably be up to 20 at % because too high $M^{II}$ contents reduce the initial saturation magnetization.

It is noted that $M^I$ and $M^{II}$ are considered as being included in Al and Fe when the atomic ratio Al/(Fe+Al) is calculated.

In this alloy, there may be contained $M^{III}$ wherein $M^{III}$ is at least one element selected from among B, C, N, and P. $M^{III}$ helps a disordered phase develop when an alloy is prepared by a quenching method or the like. $M^{III}$ is also effective for preventing a change from a disordered phase to an ordered phase. Then, $M^{III}$ is also effective in suppressing a decline of saturation magnetization during storage in a hot environment as is the aforementioned $M^I$. Besides, there is ascertained little decline of initial saturation magnetization by the addition of $M^{III}$. However, the content of $M^{III}$ should preferably be up to 10 at % of the alloy because too high $M^{aIII}$ contents reduce the change ratio of saturation magnetization. It is understood that among the elements $M^{III}$, carbon can be introduced from the dispersing medium (or organic solvent) used in milling the alloy powder, for example.

Further in this alloy, oxygen is usually contained as an incidental impurity in addition to the aforementioned elements. Oxygen tends to be introduced when the alloy is milled. Often the content of oxygen is preferably suppressed to about 3 at % or less.

In order that a magnetic recording medium such as a magnetic card have a sufficient SN ratio, the alloy should desirably have a saturation magnetization prior to heating of at least 45 emu/g, more desirably at least 50 emu/g, and reduce the saturation magnetization upon heating by at least 35 emu/g, more desirably at least 40 emu/g.

Better SN ratios are obtained when the saturation magnetization prior to heating and the drop of saturation magnetization by heating are within the above-defined ranges and the change ratio of saturation magnetization, that is, (saturation magnetization prior to heating)/(saturation magnetization after heating), is at least 2, preferably at least 3. For the alloy experiencing a great change of saturation magnetization, the sensitivity of reading can be improved if reading is carried out while a dc magnetic field is being applied. It is noted that when reading is carried out while a dc magnetic field is being applied across the alloy having a great change ratio of saturation magnetization, the coercivity of this alloy is not critical and it may be a soft magnetic one.

The saturation magnetization described herein is as measured in the normal environmental temperature range (e.g., −10° C. to 40° C.).

Cu—Mn—Al base alloys

These alloys belong to the Heusler alloys, are crystalline, and undergo an irreversible change from an antiferromagnetic phase to a ferromagnetic phase upon heating. That is, they are alloys which undergo an irreversible increase of saturation magnetization upon heating.

These alloys should preferably have the composition (expressed in atomic ratio) of $Cu_xMn_yAl_z$ wherein x=40 to 80, y=5 to 40, z=10 to 40, and x+y+z =100.

With x, y and z outside the above ranges, a sufficient change of magnetization is not obtained.

Magnetic recording layer

The magnetic recording layer 3 which is optional is an ordinary magnetic layer where reversible writing is effected. One exemplary method of using the magnetic recording layer is described below. When the magnetic recording medium of the invention is used as an ordinary prepaid card, bits of information including the monetary amount, the number of uses, and other information commonly needed for magnetic cards are recorded in the magnetic recording layer, and those bits of information included in the information recorded in the magnetic recording layer which are to be rewritten on every use, for example, the monetary amount and the number of uses are recorded in the irreversible recording layer. Whenever these bits of information are rewritten in the magnetic recording layer, the same are additionally written in the irreversible recording layer. Even when the information in the magnetic recording layer is falsely altered, such falsification can be detected by comparing the information in the magnetic recording layer with the information in the irreversible recording layer because the latter is not rewritable.

An ID code is recorded in the irreversible recording layer as a card's own fixed information, and other information is recorded in the magnetic recording layer after it is encrypted with the ID code. Then, even if the contents of the magnetic recording layer of that magnetic card are duplicated to the magnetic recording layer of another magnetic card having a different ID code, the information cannot be normally read out of the other magnetic card. Since individual cards can be recorded in the irreversible recording layer 3 with the cards' own ID codes which cannot be falsified, the invention is quite effective for preventing the forgery by duplication.

The magnetic material contained in the magnetic recording layer is not particularly limited and a proper choice may be made among barium ferrite, strontium ferrite and the like. Where the irreversible recording layer and the magnetic recording layer are arranged such that the magnetic recording layer may be heated when the irreversible recording layer is heated, advantageous use is made of a magnetic material having high heat resistance. The magnetic recording layer may be separated from the irreversible recording layer. Alternatively, after the magnetic recording layer is formed, the irreversible recording layer may be provided such that it may overlap at least a portion of the magnetic recording layer.

Substrate

The material of the substrate on which the irreversible recording layer and the magnetic recording layer are formed is not particularly limited, and any of resins and metals may be used.

Protective layer

If desired, a resinous protective layer or inorganic protective layer may be provided on the surface of the irreversible recording layer. Even when the protective layer is provided, the above-described limitation of the surface roughness (Ra) of the irreversible recording layer applies.

Second Embodiment

FIG. 5(a) shows one exemplary construction of a magnetic recording medium according to the second embodiment. This magnetic recording medium has an irreversible recording layer 4 on the surface of a substrate 2.

The second embodiment requires that in writing/reading processes, the scanning direction upon heating (which is the scanning direction of the heating means, depicted by the Y direction in the figure) is substantially perpendicular to the scanning direction upon reading (which is the scanning direction of the read head, depicted by the X direction in the figure). It is most preferable that the angle of intersection between these directions is 90° although the angle may fall in the permissible range which is determined from a relationship of the setting of the threshold value of read outputs to an azimuth loss, and preferably in the range of 80° to 100°, for example.

When a thermal head is used, it is preferred to scan in the Y direction using a line head producing a series of heated dots in the X direction in the figure.

Third Embodiment

FIGS. 8, 9(a) and 9(b) show exemplary constructions of magnetic recording media according to this embodiment. These magnetic recording media have a magnetic recording layer 3 on the surface side of a substrate and an irreversible recording layer 4 on the surface side of the magnetic recording layer 3. In this embodiment, the irreversible recording layer 4 functions as a magnetic shielding layer too.

Irreversible recording layer 4

The irreversible recording layer 4 shown in FIG. 8 contains an irreversible recording material or an irreversible recording material and a soft magnetic material. Whether or not the soft magnetic material is added to the irreversible recording layer 4 and the amount thereof added may be determined so as to provide an attenuation factor (to be described later) of at least about 80%, more preferably at least about 90%. It is noted that since the above-described irreversible recording material generally has a lower magnetic permeability than permalloy and other materials commonly used as the magnetic shielding material, the irreversible recording layer 4 consisting solely of the irreversible recording material as the magnetic material generally tends to provide an insufficient magnetic shielding effect. Accordingly, it is usually preferred to add the soft magnetic material. In order to effectively improve the shielding properties by adding the soft magnetic material, the content of soft magnetic material in the irreversible recording layer is preferably at least 10% by weight, more preferably at least 20% by weight based on the irreversible recording material plus the soft magnetic material. It is noted that the irreversible recording material should be present in the irreversible recording layer because this embodiment includes an application wherein the magnetic shielding capability of the irreversible recording layer is changed utilizing the nature of the irreversible recording material as well as an application wherein information recording is performed by heating the irreversible recording material in the irreversible recording layer, as previously described. Accordingly, an upper limit is imposed on the amount of soft magnetic material in the irreversible recording layer. Specifically, the content of soft magnetic material is preferably up to 80% by weight, more preferably up to 60% by weight based on the irreversible recording material plus the soft magnetic material.

The irreversible recording layer 4 shown in FIGS. 9(a) and 9(b) includes a soft magnetic material layer 142 and an irreversible recording material layer 141. The soft magnetic material layer 142 contains a soft magnetic material to be described later, and the irreversible recording material layer 141 contains the afore-mentioned irreversible recording material. The soft magnetic material layer 142 is located on the side of magnetic recording layer 3 in FIG. 9(a) whereas the irreversible recording material layer 141 is located on the side of magnetic recording layer 3 in FIG. 9(b). Read outputs are available in either case, although the construction of the irreversible recording material layer 141 located on the surface side of the medium as shown in FIG. 9(a) is preferable in order to increase the SN ratio in reading the information recorded in the irreversible recording material layer 141. If the irreversible recording material layer 141 is not located on the surface side of the medium, heating of the medium by a thermal head from the surface side thereof results in the irreversible recording material layer 141 experiencing an insufficient temperature rise to provide a high SN ratio.

Where the irreversible recording layer 4 is of two-layer construction wherein the irreversible recording material layer 141 is located on the surface side, the irreversible recording material layer 141 should preferably have a thickness of up to 10 μm in order to produce read-out signals with a SN ratio.

The soft magnetic material layer 142 may be either a coating formed by applying a binder along with soft magnetic material powder or a thin film formed by sputtering or the like. Preferably it is formed by coating a binder along with flattened powder.

The thickness of the soft magnetic material layer may be determined as appropriate to provide an attenuation factor (to be described later) of at least about 90% although the layer is usually about 4 to 20 μm thick, preferably 5 to 10 μm thick.

Soft magnetic material

The soft magnetic material is composed of a soft magnetic metal which undergoes no substantial change of saturation magnetization upon heating, for example, a soft magnetic metal which undergoes a change of saturation magnetization within 30% upon thermal cycling to about 400° C. The soft magnetic metal used in this embodiment is not particularly limited. That is, any of soft magnetic metals used in conventional magnetic shielding layers may be employed. A proper choice may be made among Fe—Si, permalloy and Sendust, for example.

Fourth embodiment

FIGS. 13, 14(a) and 14(b) show exemplary constructions of magnetic recording media according to this embodiment. These magnetic recording media have an irreversible recording layer 4 on the surface of a substrate 2.

Irreversible recording layer 4

The irreversible recording layer 4 shown in FIG. 13 contains the above-described irreversible recording material or the irreversible recording material and a hard magnetic material.

The irreversible recording layer 4 shown in FIG. 14 includes a hard magnetic material layer 143 and an irreversible recording material layer 141. The hard magnetic material layer 143 contains a hard magnetic material to be described later, and the irreversible recording material layer 141 contains the afore-mentioned irreversible recording material. The hard magnetic material layer 143 is located on the side of substrate 2 in FIG. 14(a) whereas the irreversible recording material layer 141 is located on the side of substrate 2 in FIG. 14(b). Either of these constructions may be employed in this embodiment although the construction shown in FIG. 14(a) allows only the irreversible recording material layer 141 to be partially removed and in such a case, the detection of alteration by the afore-mentioned mechanism becomes difficult. Accordingly, the construction shown in FIG. 13 or 14(b) is preferable. The construction shown in FIG. 13 is more preferable because the construction shown in FIG. 14(b) has the problem that in recording in the irreversible recording material layer 141, the presence of the hard magnetic material layer 143 between the heating means such as a thermal head and the irreversible recording material layer 141 prevents the irreversible recording material layer 141 from a sufficient temperature rise, failing to provide a high SN ratio.

In the construction shown in FIG. 13, the content of hard magnetic material in the irreversible recording layer 4 may be determined as appropriate to enable the detection of alteration by the above-mentioned mechanism although the content of hard magnetic material is preferably 20 to 80% by weight based on the irreversible recording material plus the hard magnetic material. With too little contents of the hard magnetic material, differential outputs are so reduced as shown in FIGS. 19(b) and 20(b) that the detection of data alteration becomes difficult. With too high contents of the hard magnetic material, on the other hand, the change of magnetization of the irreversible recording material by heating becomes smaller to render reading difficult.

The thickness of the irreversible recording layer 4 in FIG. 13 and the thickness of the irreversible recording material layer 141 in FIG. 14(a) should preferably be up to 10 μm in order to produce read-out signals with a satisfactory SN ratio.

The hard magnetic material layer 143 may be either a coating formed by applying a binder along with hard magnetic material powder or a thin film formed by sputtering or the like.

The thickness of the hard magnetic material layer 143 is not particularly limited insofar as the detection of alteration by the above-mentioned mechanism is possible, although the layer is usually 3 to 20 μm thick. It is noted that in the construction shown in FIG. 14(*b*) wherein the hard magnetic material layer 143 is located on the surface side of the irreversible recording material layer 141, the thickness of the hard magnetic material layer 143 should preferably be up to 15 μm so as not to prevent the irreversible recording material layer 141 from being heated during recording.

Hard magnetic material

The hard magnetic material used herein is a material which undergoes no substantial change of saturation magnetization upon heating, for example, a hard magnetic material which undergoes a change of saturation magnetization within 30% upon thermal cycling to about 400° C. The hard magnetic material may have a coercivity which is higher than the coercivity of the irreversible recording material, preferably at least 300 Oe. As the hard magnetic material, a proper choice may be made among barium ferrite and strontium ferrite, for example. Since the hard magnetic material is heated along with the irreversible recording material, more heat resistant ones are preferred.

Write/read procedure

Writing and reading are carried out by the aforementioned procedure. The alteration of data may be judged from the differential outputs of magnetization detected.

The biasing magnetic field used in this embodiment should be greater than the coercivity of the irreversible recording material whereas the reverse biasing magnetic field should be lower than the coercivity of the hard magnetic material.

Fifth embodiment

Recording track

Figure 22:
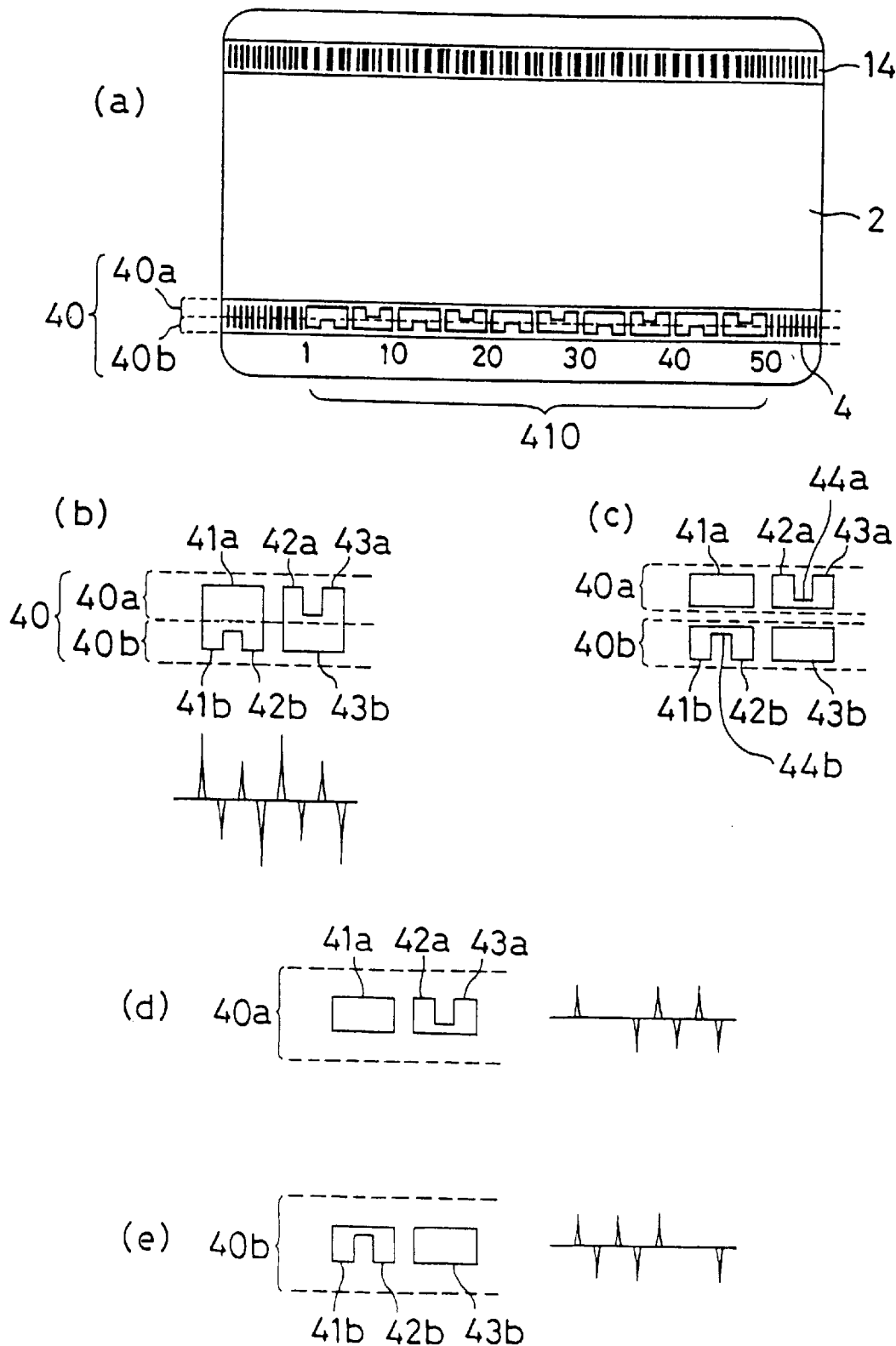
FIG. 22(a) is a plan view of a magnetic card exemplifying the magnetic recording medium used in the fifth embodiment.
FIG. 22(b) is a plan view showing in enlargement a portion of the recording track in FIG. 22(a) for illustrating the heated bar array pattern in detail, accompanied by a pattern of differential outputs read from this region of the recording track.
FIG. 22(c) is a plan view showing the recording track divided into two track elements.
FIG. 22(d) is a plan view showing one of the track elements divided from the recording track in FIG. 22(c) as an independent recording track, accompanied by a pattern of differential outputs read from this recording track.
FIG. 22(e) is a plan view showing the other of the track elements divided from the recording track in FIG. 22(c) as an independent recording track, accompanied by a pattern of differential outputs read from this recording track.

FIG. 22(*a*) is a plan view of one exemplary magnetic card to which the fifth embodiment is applied. This magnetic card has irreversible recording layers 4 and 14 on a substrate 2.

In the irreversible recording layer 4, two track elements 40*a* and 40*b* are disposed substantially parallel to each other. A recording track 40 is constructed by these two track elements. The track elements 40*a* and 40*b* each are regions where heated bars are arrayed in a bar code pattern.

The recording track 40 partially includes a region (depicted as 410 in the figure) having different array patterns of heated bars between the two track elements 40*a* and 40*b*. In this disclosure, this region is designated an asymmetric region.

FIG. 22(*b*) shows in enlargement a portion of the asymmetric region 410 of FIG. 22(*a*). In FIG. 22(*b*), the track element 40*a* includes heated bars 41*a*, 42*a*, and 43*a* and the track element 40*b* includes heated bars 41*b*, 42*b*, and 43*b*. In the illustrated embodiment, both the track elements are closely disposed or integrated although integration is not essential. A gap may be present between both the track elements as long as both the track elements can be read by a magnetic head as a single recording track.

FIG. 22(*c*) is a plan view showing the recording track which is longitudinally divided into two sections along with the substrate 2 so that the track elements 40*a* and 40*b* are separated apart. It is noted that in the illustrated example, a heated bar 44*a* which is shorter than heated bars 42*a* and 43*a* is depicted between heated bars 42*a* and 43*a* in the track element 40*a*, and a heated bar 44*b* which is shorter than heated bars 41*b* and 42*b* is depicted between heated bars 41*b* and 42*b* in the track element 40*b*. These short heated bars 44*a* and 44*b* are depicted in order to indicate that such short bars can be concomitantly formed when other heated bars are formed although the absence of short bars is preferred in practice. Nevertheless, the presence of short heated bars does not affect magnetic reading.

FIG. 22(*d*) is a plan view showing one track element 40*a* which is separated from the other track element and attached to another card substrate as an independent recording track. FIG. 22(*e*) is a plan view showing the other track element 40*b* which is attached to a further card substrate as an independent recording track. Further shown in FIGS. 22(*d*) and 22(*e*) are patterns of differential read outputs obtained when the respective track elements are magnetically read out. Also shown in FIG. 22(*b*) is a pattern of differential read outputs from the recording track 40, that is, a pattern of differential read outputs before the track elements 40*a* and 40*b* are separated apart. In these differential read output patterns, peaks corresponding to the edges of heated bars are observed. A comparison of FIG. 22(*d*) with FIG. 22(*e*) reveals that both the differential read output patterns have different peak distributions due to the difference in the array pattern of heated bars. And composition of both the differential read output patterns results in the differential read output pattern of FIG. 22(*b*).

In this embodiment, reading is performed while setting the detection level such that relative low peaks in the differential read output pattern depicted in FIG. 22(*b*) may also be detected as signals. In FIGS. 22(*d*) and 22(*e*) wherein the track elements 40*a* and 40*b* in the recording track 40 are independently recording tracks, correct information cannot be read out because the peak array patterns are different from that of FIG. 22(*b*). Therefore, the construction of the recording track from two track elements as shown in FIG. 22(*b*) makes it impossible to alter or forge a magnetic card by dividing the recording track into two.

In this embodiment, all the recording tracks need not be asymmetric regions. Where there are a plurality of data arrays in the recording track or a plurality of data recorded therein, only a portion of the recording track may be an asymmetric region depending on the importance of those data. It is noted that a plurality of asymmetric regions may be contained within one recording track.

Although two track elements are included within the recording track in the foregoing description, three or more track elements may be provided. The asymmetric region used herein is a region where the array patterns of heated bars are different between at least two of the three or more track elements. It is seen from the differential read outputs shown in FIG. 22(*b*) that as the number of track elements increases, the lowest peak becomes too low to produce satisfactory outputs. It is thus preferred that the recording track is comprised of two track elements.

FIGS. 23(*a*) and 24(*a*) illustrate exemplary different constructions of the recording track having an asymmetric region. The recording track 40 shown in each of these figures is comprised of two track elements 40*a* and 40*b* and has an asymmetric region 410. FIGS. 23(*b*) and 24(*b*) are patterns of differential outputs read from the recording tracks 40 illustrated in FIGS. 23(*a*) and 24(*a*), respectively; FIGS.

Figure 24:
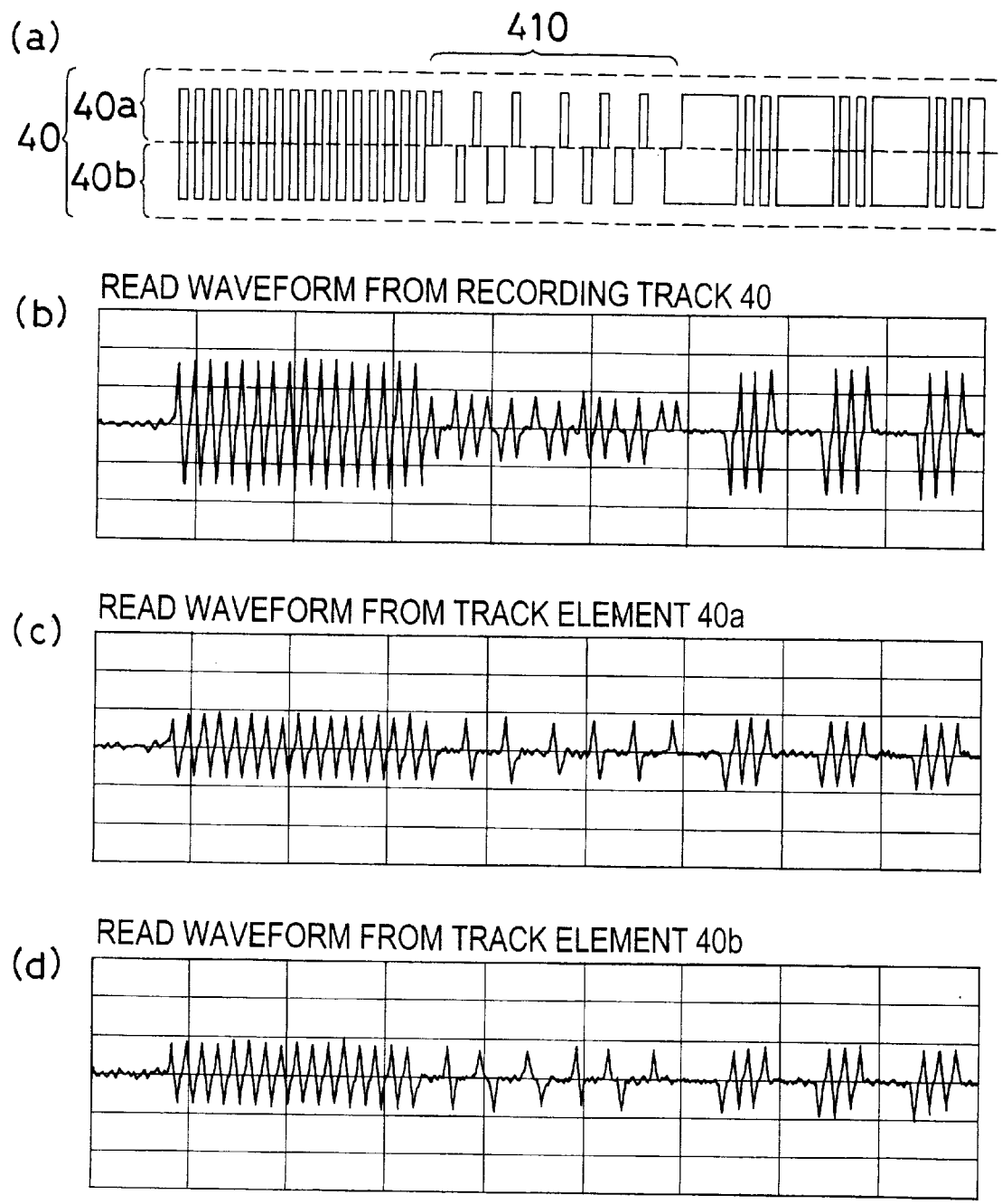
FIG. 24(a) is a plan view showing the heated bar array pattern in the recording track of the magnetic recording medium used in the fifth embodiment.
FIG. 24(b) is a pattern of differential outputs read from this recording track.
FIG. 24(c) is a pattern of differential outputs read from the recording track when the upper one of two track elements divided from the recording track of FIG. 24(a) is considered as an independent recording track.
FIG. 24(d) is a pattern of differential outputs read from the recording track when the lower one of two track elements divided from the recording track of FIG. 24(a) is considered as an independent recording track.

23(c) and 24(c) are patterns of differential outputs read from the upper track elements 40a alone illustrated in FIGS. 23(a) and 24(a), respectively; FIGS. 23(d) and 24(d) are patterns of differential outputs read from the lower track elements 40b alone illustrated in FIGS. 23(a) and 24(a), respectively. As is seen, the pattern of FIG. 23(b) results from the composition of the patterns of FIGS. 23(c) and 23(d); and the pattern of FIG. 24(b) results from the composition of the patterns of FIGS. 24(c) and 24(d).

In the asymmetric region 410 illustrated in FIG. 24(a), the heated bars of the track element 40a and the heated bars of the track element 40b do not overlap in position in the longitudinal direction of the recording track. If positions in one track element corresponding to heated bars in the other track element are heated to form heated bars, then the pattern becomes the same single bar code pattern as in the conventional recording track, allowing duplication by dividing the recording track into two. Therefore, for enhanced safety, it is preferred that the array pattern be determined such that heated bars in the respective track elements may partially overlap in the longitudinal direction of the recording track, as in the asymmetric region 410 illustrated in FIG. 23(a).

It is noted that the differential read output patterns illustrated in FIGS. 23(b), 23(c), and 23(d) and FIGS. 24(b), 24(c), and 24(d) are plotted from actual measurements. The magnetic recording medium used in measurement had an irreversible recording layer of 5.5 $\mu$m thick on the surface of a polyimide substrate of 188 $\mu$m thick. The irreversible recording layer was formed by dispersing in a binder a flattened powder of a crystalline alloy (atomic ratio composition: $Fe_{58}Al_{42}$) which reduces its saturation magnetization upon heating, and applying the solution to the substrate, followed by drying.

The type of information recorded in the recording track having an asymmetric region is not particularly limited. The information may be the fixed information that is written at the time of issue of a magnetic card or at the time of first use and not additionally written later or the additional information that is additionally written on every use of the magnetic card. Examples of the fixed information include value information and marker information. Illustrative examples of the value information and marker information are the monetary information at the time of magnetic card issue, issue number, branch number, and valid period, which may or may not be encrypted. Balance information is one example of the additional information.

It is noted that in FIG. 22, no asymmetric region is included in the recording track 14. Where the medium has a plurality of recording tracks, asymmetric regions may be, of course, provided in the plurality of recording tracks if necessary.

Writing/reading procedure

Described below is the procedure of writing and reading data in and from the irreversible recording layer of the magnetic recording medium according to this embodiment.

The asymmetric region can be formed in the recording track by any of different methods, for example, a method of scanning the recording track with a plurality of thermal heads arranged in the transverse direction of the recording track, a method of using a single thermal head and combining scanning of the recording track in the transverse direction thereof with scanning of the recording track in the longitudinal direction thereof in various ways, and a method of using a single thermal head and scanning the recording track therewith while controlling such that the positional distribution of heated spots in the transverse direction of the recording track may vary with time. Upon reading, a read head such as a conventional ring type magnetic head or a magnetoresistance (MR) type magnetic head, and a plurality of track elements in the recording track are simultaneously scanned with the read head for detecting a change of magnetization corresponding to the array pattern of heated bars, obtaining read signals.

EXAMPLE

Example 1 (First embodiment)

A $Fe_{58}Al_{42}$ alloy flattened powder with a mean particle size of 8 $\mu$m was prepared by milling in a media agitating mill an alloy powder obtained by a water atomizing method. This alloy powder was of the type that reduces saturation magnetization upon heating. The alloy powder remained crystalline immediately after quenching and even after heating to 400° C.

A coating composition having the flattened powder dispersed therein was applied onto a surface of a polyimide substrate of 188 $\mu$m thick, then dried to form an irreversible recording layer of 4.1 $\mu$m thick, obtaining a magnetic recording medium sample.

Figure 4:
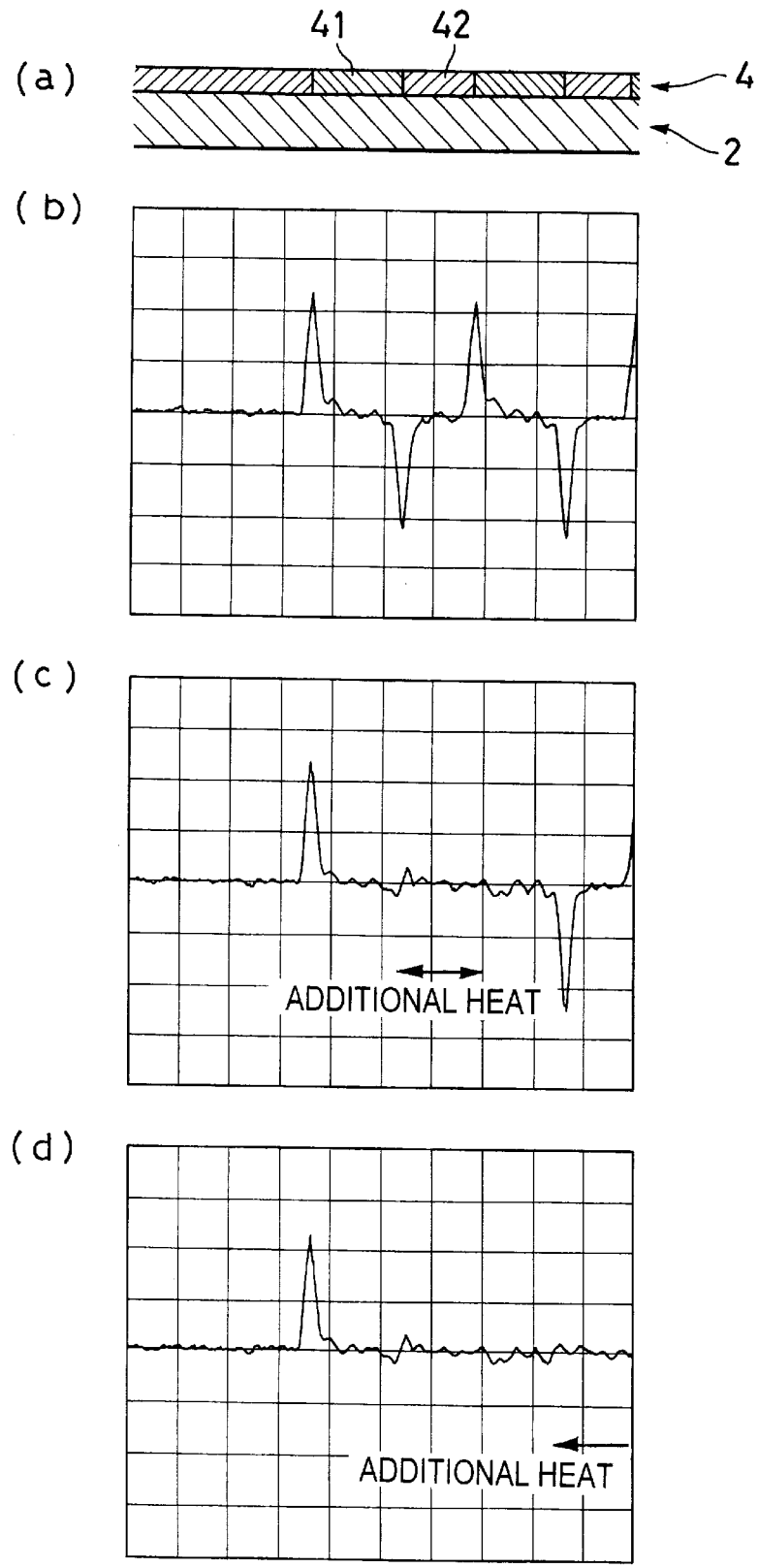
FIG. 4(a) is a cross-sectional view showing the heated pattern of the irreversible recording layer in the first embodiment.
FIG. 4(b) is a graph showing changes (differential outputs) of magnetization in the heated pattern of FIG. 4(a).
FIGS. 4(c) and 4(d) are graphs showing changes (differential outputs) of magnetization produced when the irreversible recording layer of FIG. 4(a) is additionally heated.

As shown in FIG. 4(a), the irreversible recording layer 4 of this sample was heated by a thermal head to form an initial heated region in which heated bars 41 of equal width are arrayed at equal spacings. Each heated bar had a width of 1.25 mm (corresponding to five heated dots) and each unheated bar 42 had a width of 0.75 mm. It is noted that the heating energy was 1.2 mJ/dot.

Differential outputs representative of changes of magnetization in the initial heated region are shown in FIG. 4(b). In FIG. 4(b), the lateral direction represents time, with one division being 1 ms, and the vertical direction represents output, with one division being 500 mV. These differential outputs were produced by performing reading at a read-out speed of 314 mm/s while a dc magnetic field of 1000 Oe was applied across the sample by a magnetic head.

Next, one of the unheated bars 42 situated between the heated bars 41 in the region shown in FIG. 4(a) is additionally heated by the thermal head to reduce the number of unheated bars. The additionally heated zone had a width of 1.25 mm (corresponding to five heated dots) which was greater than the width of one unheated bar. After this additional heating, differential outputs representative of changes of magnetization were determined as were in FIG. 4(b). The results are shown in FIG. 4(c). Further, an unheated bar situated adjacent the originally unheated, now additionally heated bar was also extinguished by additional heating. Differential outputs after this additional heating were determined as were in FIG. 4(b). The results are shown in FIG. 4(d).

As is evident from FIGS. 4(b), 4(c), and 4(d), unheated bars are completely extinguished by additional heating, and additional heating over a greater width than the unheated bar does not cause generation of noise.

Example 2 (Second embodiment)

A $Fe_{58}Al_{42}$ alloy flattened powder with a mean particle size of 8 $\mu$m was prepared by milling in a media agitating mill an alloy powder obtained by a water atomizing method. This alloy powder remained crystalline immediately after quenching and even after heating to 400° C.

A coating composition having the flattened powder dispersed therein was applied onto a surface of a polyimide substrate of 188 μm thick, then dried to form an irreversible recording layer of 5.5 μm thick, obtaining a magnetic recording medium sample.

The irreversible recording layer of this sample was scanned and heated with a line head, forming a heated region having a pattern wherein square heated bars of 8 mm in one side and unheated bars of the same size were consecutive.

The heated region was scanned with a read head for examining the magnetization change pattern. More particularly, reading was performed at a read-out speed of 314 mm/s while a dc magnetic field of 1000 Oe was applied across the heated region by a magnetic head. FIG. 7(a) shows the differential outputs of magnetization obtained when the heated region was scanned with the read head in a direction perpendicular to the scanning direction of the line head (see FIG. 5(a)). FIG. 7(b) shows the differential outputs of magnetization obtained when the heated region was scanned with the read head in the same direction as the scanning direction of the line head (see FIG. 6(a)). It is noted that in FIGS. 7(a) and 7(b), the lateral direction represents time, with one division being 2 ms, and the vertical direction represents output, with one division being 500 mV. FIG. 7(a) shows the results of reading in a region where two heated areas are included, and FIG. 7(b) shows the results of reading in a region where four heated areas are included.

In FIG. 7(a), the differential output due to the change of magnetization upon transition from a heated bar to an unheated bar is equal to the differential output due to the change of magnetization upon transition from an unheated bar to a heated bar. In contrast, in FIG. 7(b), a significant difference is found between these differential outputs.

Example 3–1 (Third embodiment)

A $Fe_{58}Al_{42}$ alloy flattened powder with a mean particle size of 8 μm was prepared by milling in a media agitating mill an alloy powder obtained by a water atomizing method. The heating temperature dependency of the saturation magnetization Ms of this powder was determined by the following procedure. First, the alloy powder was heated at a heating rate of 10° C./min in an IR imaging furnace, held for 1 second at the temperature at which measurement was to be made, and cooled to room temperature by gas cooling. Then using a vibrating sample magnetometer (VSM), Ms was measured at room temperature and the maximum applied magnetic field strength of 10.0 kOe. The results of measurement are plotted in FIG. 10.

Figure 10:
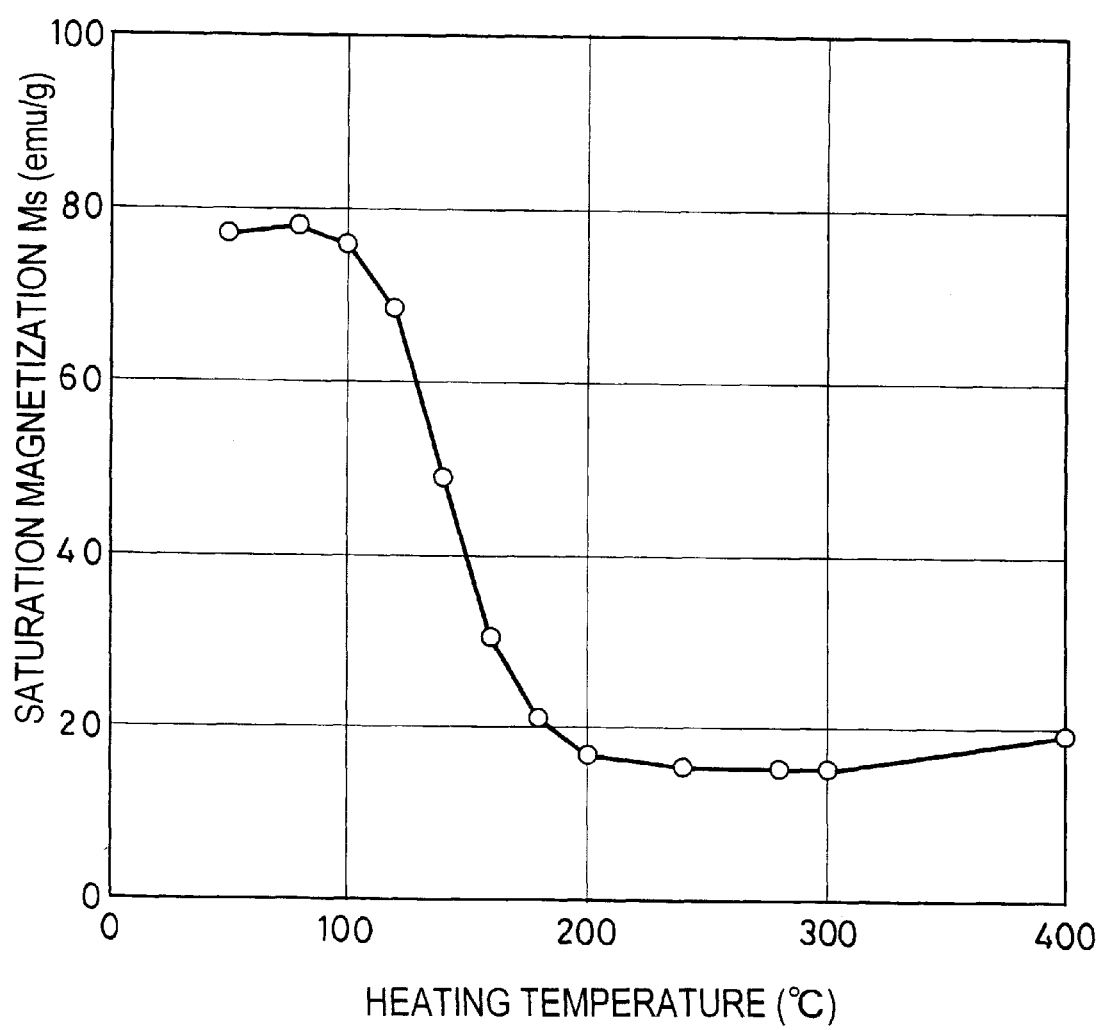
FIG. 10 is a graph showing the saturation magnetization Ms of $Fe_{58}Al_{42}$ alloy flattened powder versus heating temperature.

As seen from FIG. 10, this alloy powder reduces saturation magnetization upon heating. It is noted that the alloy powder remained crystalline immediately after quenching and even after heating to 400° C.

Next, a magnetic card sample was prepared by the following procedure.

On one entire surface of a polyimide substrate of 150 μm thick, a magnetic coating composition having Ba ferrite powder (coercivity 2,750 Oe) dispersed therein was applied so as to give a dry thickness of 12 μm, oriented under a magnetic field, then dried to form a magnetic recording layer.

Then, a Fe—Si alloy flattened powder with a mean particle size of 12 μm was prepared by milling in a media agitating mill an alloy powder obtained by a water atomizing method. A magnetic coating composition having this powder dispersed therein was applied to the surface of the magnetic recording layer, then dried to form a soft magnetic material layer. The thickness of the soft magnetic material layer is listed in Table 1.

Then, a coating composition having the $Fe_{58}Al_{42}$ alloy powder dispersed therein was applied to the surface of the soft magnetic material layer, then dried to form an irreversible recording material layer, obtaining magnetic card samples of the structure shown in FIG. 9(a). The thickness of the irreversible recording material layer is listed in Table 1.

Signals were recorded in the magnetic recording layer of each sample at a writing magnetic field of 5.0 kOe and a recording density of 210 FCI. From the output produced when a dc biasing magnetic field of 1.0 kOe was applied and the output (leakage output) produced when no biasing magnetic field was applied, an attenuation factor was determined for evaluating shielding property. The irreversible recording material layer was heated in a pattern by bringing a thermal head in contact with the surface thereof, signals were read without applying a biasing magnetic field, and the ratio of the output of a heated zone to the output of an unheated zone (remanent magnetization ratio) was calculated as a SN ratio. The results are shown in Table 1.

TABLE 1

| Sample No. | Soft magnetic material layer thickness (μm) | Irreversible recording material layer thickness (μm) | Attenuation factor (%) | SNR |
|---|---|---|---|---|
| 101 | 7 | 3 | 93 | 2.3 |
| 102 | 5 | 5 | 92 | 2.2 |
| 103 | 6 | 9 | 93 | 2.0 |
| 104 | 6 | 12 | 95 | 1.6 |
| 105 | 3 | 11 | 85 | 1.6 |

As is evident from Table 1, those samples (sample Nos. 104 and 105) in which the irreversible recording material layer has a thickness in excess of 10 μm show low SN ratios.

Each of the samples had an irreversible recording layer of the layer structure consisting of a soft magnetic material layer and an irreversible recording material layer. For comparison purposes, the dependency of shielding property on the thickness of the irreversible recording layer was examined for those irreversible recording layers which consisted of a soft magnetic material layer alone or an irreversible recording material layer alone. The measurement conditions were the same as used for the foregoing samples. The results are shown in FIG. 11.

Figure 11:
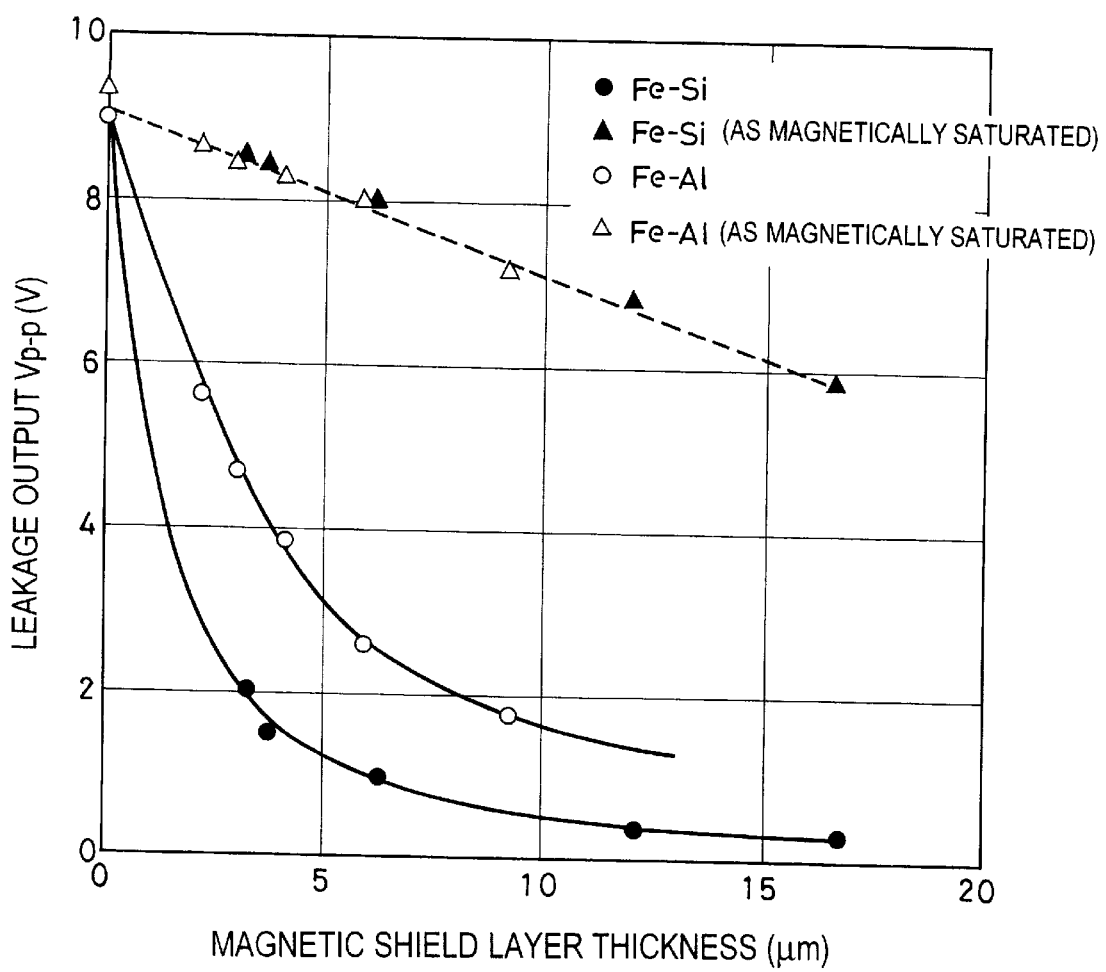
FIG. 11 is a graph showing a leakage output as measured on the surface of an irreversible recording layer functioning as a magnetic shield layer versus the thickness of the irreversible recording layer.

As seen from FIG. 11, the irreversible recording material layer produces a great leakage output as compared with the soft magnetic material layer, indicating poor shielding properties.

Figure 12:
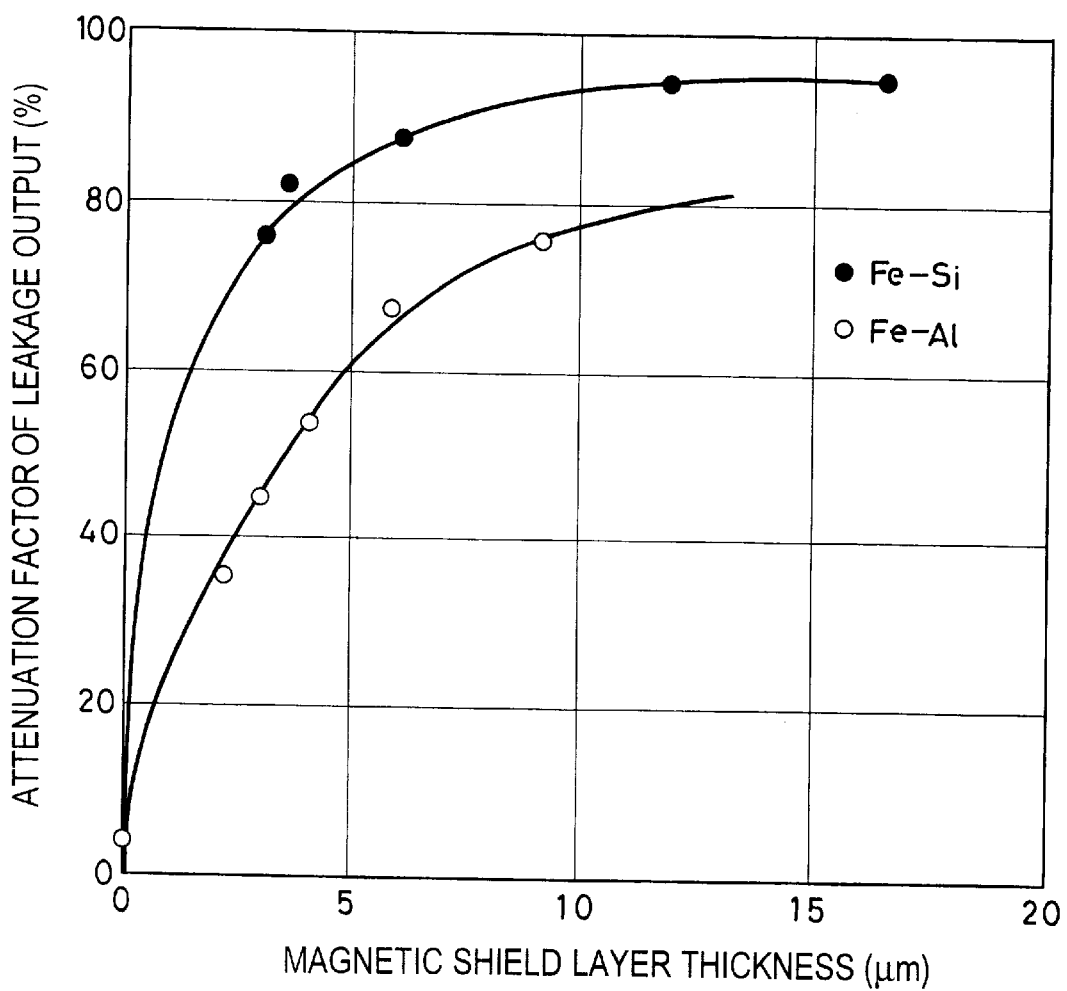
FIG. 12 is a graph showing the attenuation factor of leakage output as determined from the results of FIG. 11 versus the thickness of the irreversible recording layer.

When the irreversible recording layer was magnetically saturated by applying a biasing magnetic field, the shielding effect is eliminated so that the leakage output does not depend on the composition of the irreversible recording layer. Leakage outputs produced when the irreversible recording layer was magnetically saturated are shown in FIG. 11. Attenuation factors of leakage outputs of the respective irreversible recording layers were calculated based on the leakage output of the magnetically saturated layer. FIG. 12 shows the dependency of the attenuation factor of leakage output on the thickness of the irreversible recording layer.

It is seen from FIG. 12 that for the soft magnetic material layer used alone, an attenuation factor of more than about 80% is obtained at a thickness in excess of about 4 μm. For the irreversible recording material layer used alone, an attenuation factor of more than about 60% is obtained at a thickness in excess of about 6 μm. It is, therefore, expected that an attenuation factor of more than about 90% is obtained when a soft magnetic material layer and an irreversible recording material layer are stacked to form an irreversible recording layer with a thickness of at least about 10 μm. This coincides well with the results shown in Table 1. It is seen from FIG. 12 that an attenuation factor of about 80% is achievable with an irreversible recording material layer used alone.

Example 3-2 (Third embodiment)

Magnetic card samples were prepared as in Example 3-1 except that a soft magnetic material layer of 5 μm thick was formed using a coating composition having a Sendust flattened powder dispersed therein, and an irreversible recording material layer of 7 μm thick was formed using a coating composition having dispersed therein a $Cu_2MnAl$ alloy flattened powder with a mean particle size of about 16 μm flattened by a media agitating mill. In preparing the samples, the surface roughness (Ra) of the surface of the irreversible recording layer (irreversible recording material layer) was adjusted by changing the time of milling the $Cu_2MnAl$ alloy powder in the media agitating mill. Ra values of the samples are listed in Table 2.

For the respective samples, measurement was made as in Example 3-1, with the results shown in Table 2.

TABLE 2

| Sample No. | Surface roughness Ra (μm) | Attenuation factor (%) | SNR |
|---|---|---|---|
| 201 | 0.4 | 92.6 | 2.4 |
| 202 | 0.8 | 92 | 2.2 |
| 203 | 1.0 | 91.3 | 2.0 |
| 204 | 1.6 | 86 | 1.3 |
| 205 | 1.9 | 84 | 1.1 |

It is seen from Table 2 that those samples having a surface roughness Ra in excess of 1 μm show very low SN ratios and low attenuation factors and are thus rather unacceptable for practical use.

Example 3—3 (Third embodiment)

A magnetic card sample was prepared as in Example 1 except that a soft magnetic material layer of 8 μm thick was formed using a coating composition having an Fe—Si alloy flattened powder dispersed therein, and an irreversible recording material layer of 0.5 μm thick was formed by an RF sputtering process using an $Fe_{61}Mn_{25}C_{14}$ alloy target.

This sample was measured as in Example 3-1, finding an attenuation factor of 90% and a SN ratio of 1.9. As is evident from these results, a magnetic shielding layer (irreversible recording layer) of two-layer structure displaying improved characteristics is obtained even when the irreversible recording layer was formed by a vacuum film deposition process.

Example 4 (Fourth embodiment)

A $Fe_{58}Al_{42}$ alloy flattened powder with a mean particle size of 8 μm was prepared as an irreversible recording material by milling in a media agitating mill an alloy powder obtained by a water atomizing method. This alloy powder remained crystalline immediately after quenching and even after heating to 400° C.

Also, a cobalt-adsorbed $\gamma$-$Fe_2O_3$ powder (coercivity about 700 Oe) was furnished as a hard magnetic material.

A magnetic coating composition containing the irreversible recording material and the hard magnetic material in a weight ratio of 1:1 was applied onto the surface of a polyimide substrate of 188 μm thick and dried to form an irreversible recording layer of 8 μm thick, obtaining a magnetic recording medium sample.

Figure 21:
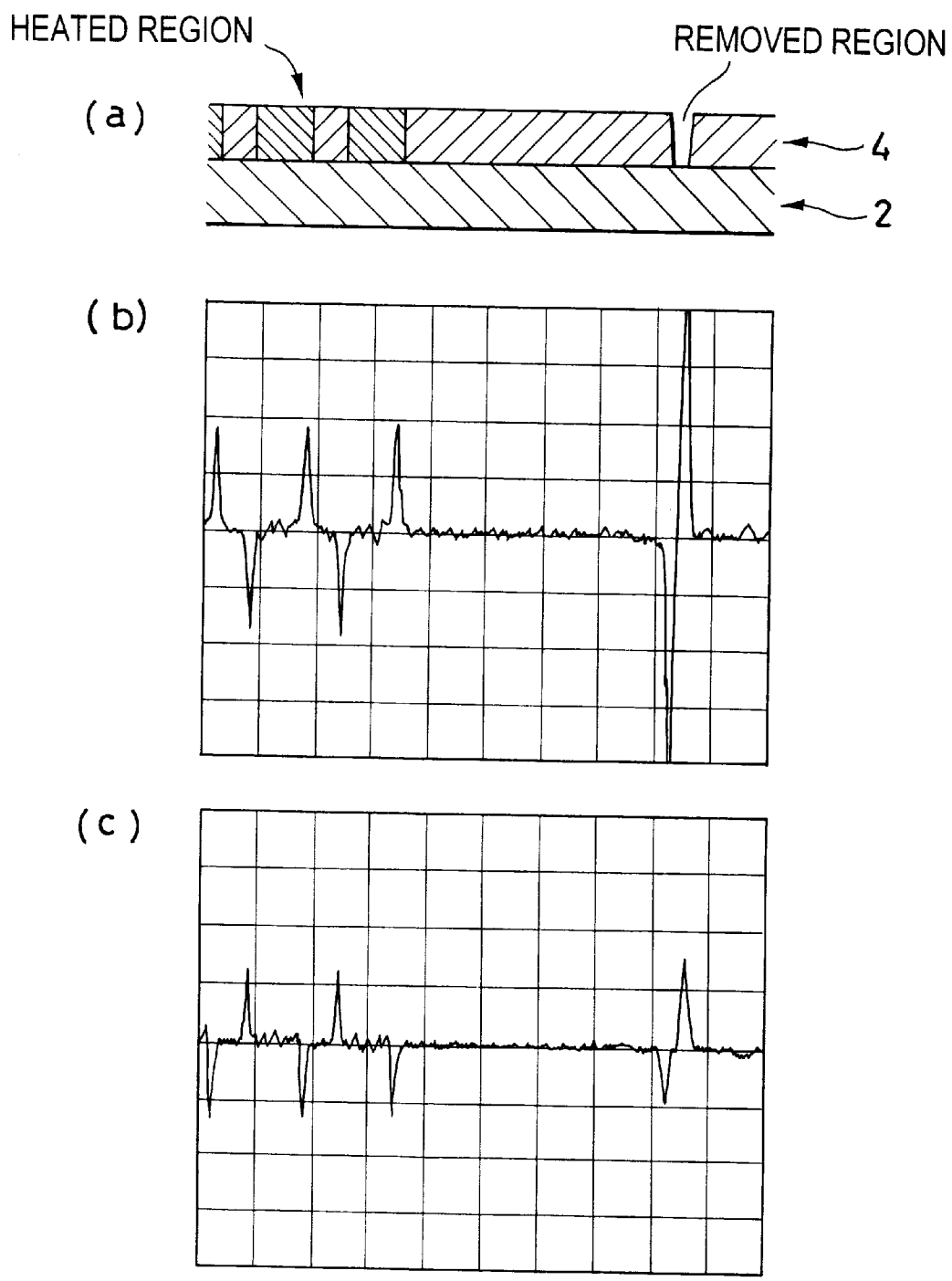
FIG. 21(a) is a cross-sectional view showing patterns of heating and removal in the irreversible recording layer.
FIG. 21(b) is a graph showing differential outputs produced when the irreversible recording layer of FIG. 21(a) is read while applying a forward biasing magnetic field.
FIG. 21(c) is a graph showing differential outputs produced when the irreversible recording layer of FIG. 21(a) is read while applying a reverse biasing magnetic field.

As shown in FIG. 21(a), the irreversible recording layer 4 of this sample was heated by a thermal head to form a pattern in which heated regions of equal width are arranged at equal intervals. Also, the irreversible recording layer 4 was notched by a cutter, forming a removed region as shown in the figure. The heated regions each had a width of 1.25 mm (corresponding to five heated dots), and the unheated regions between the heated regions had a width of 0.75 mm. The heating energy was 1.2 mJ/dot.

Next, signals were read from the irreversible recording layer at a read rate of 314 mm/s while a forward biasing magnetic field of 2 kOe or a reverse biasing magnetic field of 300 Oe was applied thereacross. The differential outputs under the forward biasing magnetic field applied are shown in FIG. 21(b), and the differential outputs under the reverse biasing magnetic field applied are shown in FIG. 21(c). In the graphs of FIGS. 21(b) and 21(c), the lateral direction represents time, with one division being 2 ms, and the vertical direction represents output, with one division being 200 mV.

As seen from these graphs, the differential outputs based on heating and the differential outputs based on the removal of the irreversible recording layer are clearly discriminated from each other both when the forward and reverse biasing magnetic field are applied. And a comparison between these graphs reveals that the false alteration of data by removal of the irreversible recording layer can be readily detected.

Obviously, numerous modifications and variations of the present invention are possible in light of the above teachings. It is therefore to be understood that within the scope of the appended claims, the invention may be practiced otherwise than as specifically described herein.

What is claimed is:

1. A method of making a magnetic recording medium comprising the steps of:

forming an irreversible recording layer supported by a substrate and including an irreversible recording material capable of undergoing an irreversible change of saturation magnetization upon heating, heating said irreversible recording layer to form an initial heated region in which a plurality of heated bars having a saturation magnetization irreversibly changed are arrayed in a bar code pattern, and converting unheated bars disposed between the heated bars into a heated state thereby changing the array pattern of heated bars and effecting information recording.

2. A method of making a magnetic recording medium according to claim 1, wherein the step of converting unheated bars into a heated state changes the array pattern of heated bars into an encoded array pattern.

3. A method of making a magnetic recording medium according to claim 1, wherein the heating step is performed so as to form a region in the irreversible recording material where the heated bars are of equal width and arrayed in an equi-spacing pattern.

4. A method of making a magnetic recording medium according to claim 1, wherein the steps of heating and converting are performed by scanning said irreversible recording layer with a heating element in a scanning direction substantially perpendicular to a reading direction in which the irreversible recording layer is scanned with a read head during reading operation.

5. A method of making a magnetic recording medium according to claim 1, further comprising a step of forming a magnetic recording layer between said irreversible recording layer and said substrate.

6. A method of making a magnetic recording medium as set forth in claim 5, wherein the step of forming said irreversible recording layer is performed so as to include in said irreversible recording layer a soft magnetic material in addition to the irreversible recording material.

7. A method of making a magnetic recording medium as set forth in claim 5, wherein the step of forming said irreversible recording layer is performed so as to include in said irreversible recording layer a soft magnetic material layer containing said soft magnetic material and an irreversible recording material layer containing said irreversible recording material.

8. A method of making a magnetic recording medium according to claim 1, wherein the step of forming said irreversible recording layer is performed so as to include a hard magnetic material whose saturation magnetization does not substantially change upon heating and which has a higher coercivity than said irreversible recording material.

9. A method of making a magnetic recording medium as set forth in claim 8, wherein the step of forming said irreversible recording layer is performed so as to form of an irreversible recording material layer containing said irreversible recording material and a hard magnetic material layer containing said hard magnetic material.

10. A method of reading a magnetic recording medium including a hard magnetic material and an irreversible recording material included in a layer having unheated bars and heated bars with irreversibly changed saturation magnetization arrayed in a bar code pattern, said method of reading comprising the steps of:
 magnetizing the hard magnetic material in a hard magnetizing direction,
 detecting a magnetization change of said irreversible recording layer, and
 applying a biasing magnetic field in an orientation opposite to said hard magnetizing direction and at a level that does not cause said hard magnetic material to reverse its magnetization.

11. A method of reading a magnetic recording medium including a hard magnetic material and an irreversible recording material included in a layer having unheated bars and heated bars with irreversibly change saturation magnetization arrayed in a bar code pattern, said method of reading comprising the steps of:
 magnetizing the hard magnetic material in a hard magnetizing direction,
 detecting a magnetization change of said irreversible recording layer, and
 applying a biasing magnetic field in an orientation of said hard magnetizing direction.

12. A method of reading a magnetic recording medium as set forth in claim 10, wherein the level of the biasing magnetic field is lower than a coercivity of said hard magnetic material and higher than a coercivity of said irreversible recording material.

13. A method of making a magnetic recording medium according to claim 1, wherein:
 the heating step is performed so as to provide at least two track elements in which heated bars are arrayed in a bar code pattern, said at least two track elements being arranged substantially parallel to each other to construct one recording track, and
 the recording track includes at least in part an asymmetric region in which the array pattern of heated bars differs between at least two track elements.

14. A method of reading a magnetic recording medium as set forth in claim 11, wherein a level of the biasing magnetic field is lower than a coercivity of said hard magnetic material and higher than a coercivity of said irreversible recording material.

15. A magnetic recording medium comprising:
 a substrate; and
 an irreversible recording layer supported by said substrate and including an irreversible recording material capable of undergoing an irreversible change of saturation magnetization upon heating, said irreversible recording layer comprising:
  a heated region including a plurality of heated bars having an irreversibly changed saturation magnetization and arrayed in a bar code pattern, and
  an unheated region including a plurality of unheated bars disposed between the heated bars and capable of being heated so as to change the bar code pattern;
 wherein the changed bar code pattern corresponds to recorded information.

16. A magnetic recording medium according to claim 15, wherein the magnetic recording medium is a magnetic card, and the recorded information corresponds to fixed information recorded at a time of issue of the magnetic card.

17. A magnetic recording medium according to claim 15, wherein the recorded information corresponds to use history of the magnetic recording medium.

18. A magnetic recording medium according to claim 15, wherein the changed bar code pattern corresponds to an encoded array pattern.

19. A magnetic recording medium according to claim 15, wherein the heated region includes a region where the heated bars are of equal width and arrayed in an equidspacing pattern.

20. A magnetic recording medium according to claim 15, further comprising a magnetic recording layer located between the substrate and the irreversible recording layer so that the irreversible recording layer is capable of shielding the magnetic recording layer.

21. A magnetic recording medium according to claim 20, wherein the irreversible recording layer further comprises a soft magnetic material.

22. A magnetic recording medium according to claim 20, wherein the irreversible recording layer comprises a soft magnetic material layer including said soft magnetic material and an irreversible recording material layer including said irreversible recording material.

23. A magnetic recording medium according to claim 15, wherein the irreversible recording layer further comprises a hard magnetic material having a saturation magnetization that does not substantially change upon heating and a higher coercivity than said irreversible recording material.

24. A magnetic recording medium according to claim 23, wherein the irreversible recording layer comprises an irreversible recording material layer including said irreversible recording material and a hard magnetic material layer comprising said hard magnetic material.

25. A magnetic recording medium according to claim 22, wherein the hard magnetic material has a coercivity of at least 300 Oe.

26. A magnetic recording medium according to claim 23, wherein the hard magnetic material has a coercivity of at least 300 Oe.

27. A magnetic recording medium according to claim 15, wherein the irreversible recording layer comprises at least two track elements in which the heated bars are arrayed in a bar code pattern, said track elements being substantially parallel to each other so as to form one recording track.

28. A magnetic recording medium according to claim 27, wherein the recording track comprises an asymmetric region in which the array pattern of heated bars differs between said at least two track elements.

29. A magnetic recording medium according to claim 15, wherein the irreversible recording layer has a surface roughness of up to 1 $\mu$m.

* * * * *